(12) United States Patent
Salameh et al.

(10) Patent No.: US 10,269,051 B2
(45) Date of Patent: Apr. 23, 2019

(54) SOCIAL-MARKETPLACE SYSTEM AND METHOD

(71) Applicant: FullGlass, Inc., Cape Coral, FL (US)

(72) Inventors: Mark Salameh, Cape Coral, FL (US); Devin Linsenbach, Tampa, FL (US)

(73) Assignee: FullGlass, Inc., Cape Coral, FL (US)

( * ) Notice: Subject to any disclaimer, the term of this patent is extended or adjusted under 35 U.S.C. 154(b) by 653 days.

(21) Appl. No.: 14/555,630

(22) Filed: Nov. 27, 2014

(65) Prior Publication Data

US 2015/0149321 A1    May 28, 2015

Related U.S. Application Data

(60) Provisional application No. 61/909,582, filed on Nov. 27, 2013.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0613* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,945,482 B2 | 5/2011 | Law et al. | |
| 8,291,016 B1 | 10/2012 | Whitney et al. | |
| 8,359,005 B2 | 1/2013 | Smith et al. | |
| 8,392,270 B2 | 3/2013 | Ho et al. | |
| 8,392,271 B2 | 3/2013 | Ho et al. | |
| 8,401,918 B2 | 3/2013 | Mesaros | |
| 8,417,577 B2 | 4/2013 | Law et al. | |
| 2005/0086376 A1* | 4/2005 | Park | H04L 67/24 709/245 |
| 2008/0228595 A1* | 9/2008 | Hill | G06Q 30/0603 705/26.41 |
| 2010/0223097 A1* | 9/2010 | Kramer | G06Q 30/02 705/14.16 |
| 2013/0006788 A1* | 1/2013 | Zhou | G06Q 50/01 705/26.1 |
| 2013/0124357 A1* | 5/2013 | He | G06Q 30/08 705/26.3 |
| 2013/0179948 A1* | 7/2013 | Ho | G06Q 30/02 726/4 |

(Continued)

OTHER PUBLICATIONS

Nael Kabbany; "Developing E-market Model using Social Networks"; Sep. 2011; IEEE; ISIEA2011 (Year: 2011).*

(Continued)

*Primary Examiner* — Naeem U Haq
*Assistant Examiner* — Norman Donald Sutch, Jr.
(74) *Attorney, Agent, or Firm* — Milford A. Keshishian

(57) ABSTRACT

The present invention discloses a system and method for facilitating commerce between accounts of individual client computing devices with preexisting relationship and more particularly, a system and a method that provides a host computing platform to enable related client accounts of client computing devices to transact products, with an embodiment of the present invention associating the host computing platform with a network-based social-media platform.

10 Claims, 42 Drawing Sheets

(56) References Cited

U.S. PATENT DOCUMENTS

| | | | |
|---|---|---|---|
| 2013/0212177 A1* | 8/2013 | Friedman | H04L 67/22 709/204 |
| 2013/0332290 A1* | 12/2013 | Medrano | G06Q 30/02 705/14.73 |
| 2014/0025531 A1* | 1/2014 | Nachiappan | G06Q 30/0631 705/26.7 |
| 2015/0100458 A1* | 4/2015 | Linden | G06Q 50/01 705/26.8 |

OTHER PUBLICATIONS

Kyle Chard; "Social Cloud: Cloud Computing in Social Networks"; 2010; IEEE; 2010 IEEE 3rd International Conference on Cloud Computing (Year: 2010).*

* cited by examiner

SOCIAL-MARKETPLACE SYSTEM AND METHOD

CROSS-REFERENCE TO RELATED APPLICATIONS

This application claims the benefit of priority of the co-pending U.S. Utility Provisional Patent Application 61/909,582, with a filing date Nov. 27, 2013, the entire disclosures of which is expressly incorporated by reference in its entirety herein. It should be noted that where a definition or use of a term in the incorporated patent applications is inconsistent or contrary to the definition of that term provided herein, the definition of that term provided herein applies and the definition of that term in the incorporated patent applications does not apply.

BACKGROUND OF THE INVENTION

Field of the Invention

One or more embodiments of the present invention provide a system and method for facilitating commerce between individual client devices with preexisting relationship and more particularly, a system and a method that provides a host computing platform to enable networked client devices to transact products or services, with an embodiment of the present invention associating the host platform with a network-based social-media platform.

Description of Related Art

Conventional network-based commerce platforms and network-based social media platforms are well known and have been in use for a number of years. A non-limiting example of a commerce platform may include AMAZON.COM®, and a social media platform may include FACEBOOK.COM®.

Attempts have been made to tap into the vast user base of network-based social media platforms to introduce capabilities related to commerce (e.g., buy, sell, trade, etc.) between networked user client devices with preexisting relationships (e.g., friends on FACEBOOK®). However, most require extensive modifications to the network-based social media platform, fundamentally affecting function, operation, and users experiences of the social platforms.

Accordingly, in light of the current state of the art and the drawbacks to current network-based commerce and social-media platforms mentioned above, a need exists for an independent network-based social-marketplace platform that would facilitate and promote commerce between related accounts of client devices, including one using various aspects of network-based social-media platform with which the network-based social-marketplace platform is associated, but without affecting the network-based social media platforms.

BRIEF SUMMARY OF THE INVENTION

A non-limiting, exemplary aspect of an embodiment of the present invention provides a transaction system, comprising:

a plurality of client computing devices that are networked by one or more server computing machines of a network;

the one or more server computing machines of the network enable establishment of a relationship between two or more accounts of two or more client computing devices of the plurality of client computing devices based on a predetermined criteria, with the two or more client computing devices with related accounts forming related client computing devices;

one or more server computing machines of the network allow transaction between the related client computing devices only, while excluding non-related but networked client computing devices from transaction within the network.

Another non-limiting, exemplary aspect of an embodiment of the present invention provides a transaction system, comprising:

a plurality of client computing devices that are networked by one or more server computing machines of a first network;

the one or more server computing machines of the first network enable establishment of a relationship between two or more accounts of two or more client computing devices of the plurality of client computing devices based on a first predetermined criteria, with the two or more client computing devices with networked accounts forming networked client computing devices;

two or more of the networked client computing devices are further networked on one or more server computing machines of a second network that is associated with the one or more server computing machines of the first network based on a second predetermined criteria to form related client computing devices;

one or more server computing machines of the second network allow transaction between the related client computing devices only, while excluding non-related client computing devices from transactions on the second network.

A further, non-limiting, exemplary aspect of an embodiment of the present invention provides a method for transaction, comprising:

networking client computing devices;

establishing a relationship between accounts of two or more networked client computing devices;

allowing transactions only between two or more networked client computing devices with established relationships while excluding other networked client computing devices from transaction.

Still another non-limiting, exemplary aspect of an embodiment of the present invention provides a non-transitory computer-readable storage device storing instructions stored that, when executed by one or more processors, cause the one or more processors to perform operations, comprising:

establishing relationships between two or more accounts of networked client computing devices based on a predetermined criteria, resulting in related client devices;

allowing transaction only between the related client computing devices with established relationship between accounts, whiled excluding networked but non-related client computing devices.

Yet another non-limiting, exemplary aspect of an embodiment of the present invention provides a system for categorizing products for transactions, comprising:

a client computing device through a client device browser forwards a request to a network-based social-marketplace platform to create a category;

the network based social-marketplace platform returns an electronic category record to the client computing device, which is displayed by the client computing device browser to enable creation of the category;

client computing device forwards the electronic category record with set values for attributes of the electronic category record to the network-based social-marketplace platform, with the electronic category record and values of the attributes thereof stored within database servers computing machines of the network-based social-marketplace platform;

the stored electronic category record includes one or more attributes and respective values thereof that associate the electronic category record with an electronic client record of a client account.

A further, non-limiting, exemplary aspect of an embodiment of the present invention provides a system for generating relations on a network for transactions, comprising:

a client computing device forwards a generate relations request to network-based social-marketplace platform to network with other client computing devices on network-based social-marketplace platform, which have a preexisting relationship with the client computing device on a network-based social-media platform;

the network based social-marketplace platform receives and forwards the networking request to the network-based social-media platform for generating an electronic relations record for an account of the client computing device;

network-based social-media platform receives the networking request from the network-based social-marketplace platform and retrieves and generates an electronic record of networked users accounts of a user profile connected with client computing device based on client account of a client profile stored on network-based social-marketplace platform;

the electronic record of networked users accounts is forwarded to the client computing device by network-based the social-media platform, includes a listing of the networked users accounts;

the client computing device forwards an invitation to selected users accounts from electronic record of networked users accounts to the network-based social-media platform; the network-based social-media platform forwards invitations to the selected networked users accounts.

Yet a further, non-limiting, exemplary aspect of an embodiment of the present invention provides a method for transacting, comprising:

receiving, at a network-based social-marketplace platform configured to provide marketplace functions and corresponding to a website, a request for a product from a client computing device for transaction;

forwarding a list of products of only related client computing devices that are related to the client computing device of the network-based social-marketplace platform, while excluding list of products of non-related client computing devices.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIG. 11A-1 to 11C-2 are non-limiting, exemplary illustrations for product related functionalities in accordance with one or more embodiment of the present invention;

FIG. 12A to 12B-3 are non-limiting, exemplary illustrations for generating wanted ad in accordance with one or more embodiment of the present invention;

DETAILED DESCRIPTION OF THE INVENTION

Figure 1A:
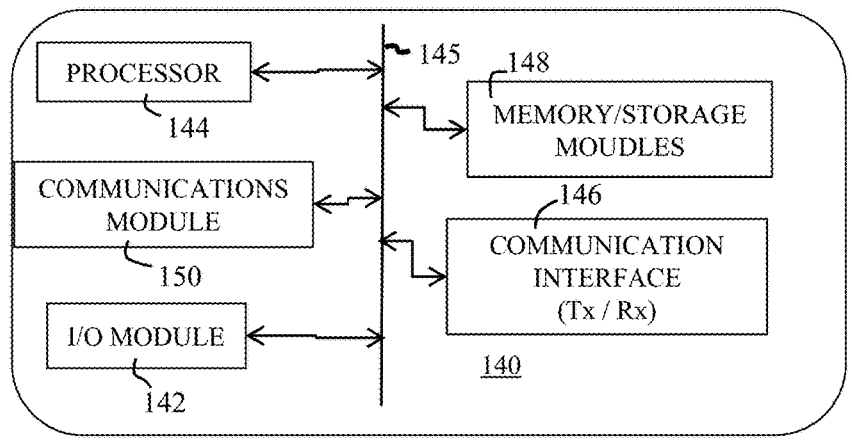
FIGS. 1A and 1B are non-limiting, exemplary illustrations of conventional computing machines that may include servers and or client devices.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

In the description given below and the corresponding set of drawing figures, when it is necessary to distinguish the various members, elements, sections/portions, components, parts, or any other aspects (functional or otherwise) or features of a device(s) or method(s) from each other, the description and the corresponding drawing figures may follow reference numbers with a small alphabet character such as (for example) "client device 108a, 108b, 108c, 108x, 108y, and etc." If the description is common to all of the various members, elements, sections/portions, components, parts, or any other aspects (functional or otherwise) or features of a device (s) or method(s) such as (for example) to all client devices 108a, 108b, 108c, 108x, 108y, etc., then they may simply be referred to with reference number only and with no alphabet character such as (for example) "client device 108."

The below-described computer hardware and software are presented for purposes of illustrating the basic underlying client-device and server computer components that may be employed for implementing one or more embodiments of the present invention. For purposes of discussion, the following description will present examples in which it may be assumed that there exists one or more "server" (e.g., database servers and/or application servers, etc.) that communicates with one or more client-devices (e.g., personal computers, mobile devices, or others). Any one of the one or more embodiments of the present invention, however, is not limited to any particular environment or device configuration. In particular, a client/server distinction is not necessary to the invention, but is used to provide a framework for discussion. Instead, one or more embodiments of the present invention may be implemented in any type of system architecture (e.g., peer-to-peer, client/server, hybrid of both) or processing environment capable of supporting the methodologies of the various embodiments of the present invention presented in detail below. Therefore, for example, while one or more embodiments of the present invention may operate within a single computing machine (server or client device) or operate directly between client devices without the use of servers, a non-limiting, exemplary embodiment of the present invention is embodied in a computer system such as a client/server, peer-to-peer, or a hybrid combination. Client/server, peer-to-peer, or hybrid combination environments, database and or application servers, and networks are very well documented in the technical, trade, and patent literature.

Additionally, various embodiments of the present invention provide a user interface that is understandable by human intellect and human senses for interaction. A non-limiting example of a user interface may include a graphic user interface (GUI) to allow a visual way of interacting with the various elements of the present invention. The disclosed user interface provided throughout the disclosure is meant to be illustrative and for convenience of example only and should not be limiting. Therefore, various embodiments of the present invention are not limited to any particular GUI configuration and may be implemented in a variety of different types of user interfaces. Further, all GUI representations of any concepts, aspects, functions, or features may be varied and therefore, none should be limiting. The non-limiting, non-exhaustive illustrations of the GUI used throughout the disclosure are provided only for a framework for discussion. For example, the mere act or function of "selection" (e.g., selecting to create a category or virtual storefront such as a garage for a garage sale, which is detailed below) may be accomplished by numerous GUI configurations or representations of the concept of "selection" that are too numerous to mention individually, non-exhaustive, non-limiting examples of which may include the use of GUI radio-buttons, GUI pull-down menus, individual GUI icons that are tapped, which may direct users to other types of "selection" GUI, a simple list of links that may be tapped or selected and etc. As another simple example, GUI that is used to represent an "upload feature" button to upload an image for example, or some other concept, aspect, function, or feature may be represented by a completely different set of GUI representations (i.e., configurations, shapes, colors, etc.) shown in the present application without limitations and without departing from the spirit and scope of the claims.

Figure 1B:
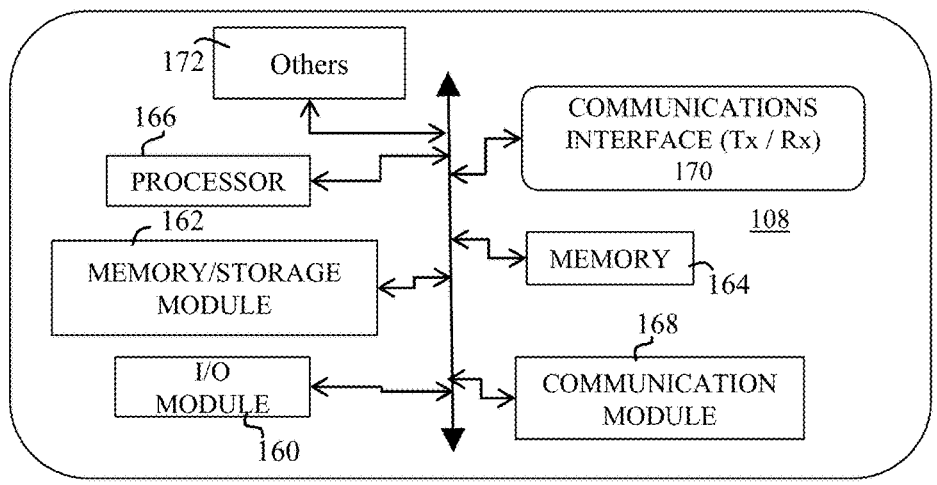

Any one or more of the embodiments of the present invention may be implemented on conventional computing machines that may include servers and or client devices. FIG. 1A is an exemplary illustration of well-known, conventional computing machine as exemplary server computing machines or simply, server device hardware or server(s), and FIG. 1B is an exemplary illustration of well-known, conventional computing machine as exemplary client computing machines (or simply client device(s)) hardware.

As illustrated in FIG. 1A, the server computing machines for implementing one or more embodiments of a network-based social-marketplace platform 102 (FIG. 1C) of the present invention may include one or more well-known conventional server computing machines or devices (hereinafter referred to simply as "server" or "servers") in one or more locations. The exemplary illustrated server 140 is an example representing a typical conventional server (that may function as a database, application, or other types of servers) that is comprised of input and output (I/O) module 142 for receiving information and or data from various devices, including, but not limited to Cloud Computing Systems and services, client devices, other servers and so on, including any external computers connected to the server 140, a network and or Internet connection, or any non-transitory computer readable medium.

I/O module 142 may also be configured for receiving user input from another input device such as keyboard, a mouse, or any other input device (e.g., touch screen). Note that I/O module 142 may include multiple "ports" for receiving data and user input, and may also be configured to receive information from remote databases or computer or servers using wired or wireless connections, including other external systems.

I/O module 142 is connected with processor 144 via a bus system 145 for providing output to various entities, possibly through a video display. Output may also be provided to other devices or other programs, e.g. to other software modules or Cloud Computing Systems and services for use therein, or possibly serving as a wired or wireless gateway to external databases or other processing devices such as client devices.

Further associated with servers 140 is a communication module 150 for implementing desired communication protocol and a communication interface 146, which may include a wireless or wired transceiver Tx/Rx for implementing desired communications protocols. Processor 144 is coupled with a memory/storage module 148 (e.g., Random Access Memory, Read Only Memory, Hard drive, Cloud Computing systems, etc.) to permit software such as control information to be manipulated by commands to the processor 144. Memory/storage module 148 may also include other storage solutions or computer readable medium for storage of data (e.g., removable media such as CD, DVD, flash drive, etc.) and or fixed storage, Cloud Computing Systems and services storage, etc.

As stated above, FIG. 1B is an exemplary illustration of well-known, conventional computing machine as client computing machines or devices that may be used to implement and access one or more embodiments of the network-based social-marketplace platform 102 of the present invention. As illustrated, the client computing device 108 (hereinafter simply referred to as client device 108) may be any well-known conventional computing machine, non-limiting examples of which may include netbooks, notebooks, laptops, smart tablets, mobile devices such as feature or smart mobile phones, or any other devices that are Network and or Internet enabled. The client device 108 includes the typical, conventional components such as an I/O module 160 (e.g., a keyboard or touch screen display, etc.), a storage module 162 for storing information (may use Cloud Computing Systems and services), a memory 164 used by a processor 166 to execute programs, a communication module 168 for implementing desired communication protocol, a communications interface (e.g., transceiver module) 170 for transmitting and receiving data, and may or may not include other components 172 such as an image/video/sound capture device such as a camera, voice recording microphone, stylus, etc.

Figure 1C:
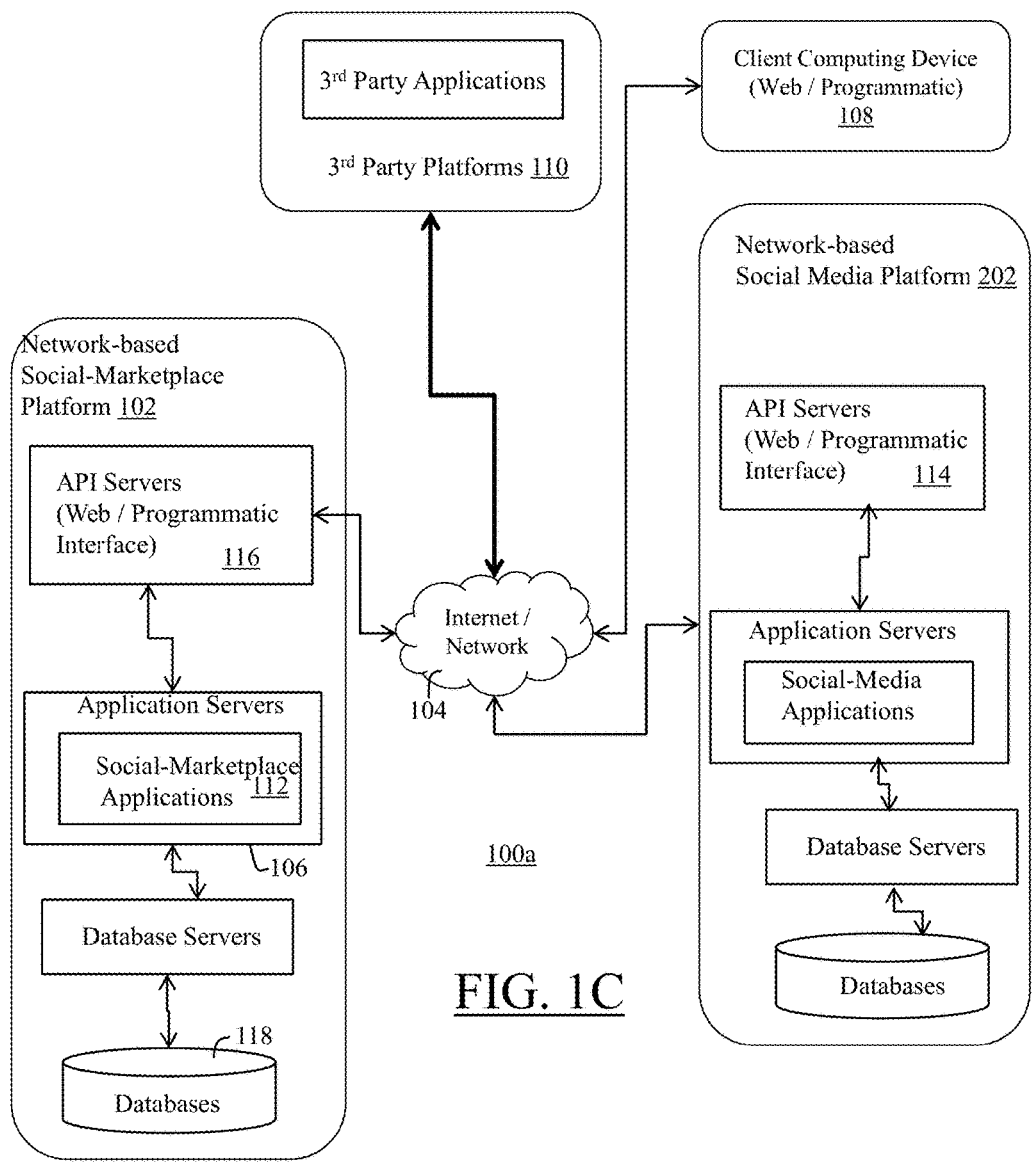
FIG. 1C is a non-limiting, exemplary illustration of a general overview of a system architecture for implementing one or more embodiments of the present invention.

FIG. 1C illustrates the general overview of system architecture for implementing one or more embodiments of the present invention. As shown, system 100a comprises one or more client devices 108 connected to network-based social-marketplace platform 102 and or a conventional network-based social-media platform 202 via Internet/Network 104. Specifically, the client devices 108 comprise one or more standalone client devices (e.g., mobile Smartphone) connected to one or both of network-based social-marketplace platform 102 and or conventional network-based-social media platform 202 using a conventional network/Internet 104 and conventional communications protocols.

The network/Internet 104 may be any one of a number of conventional, well-known network systems that includes functionality for packaging client device 108 communications in the well-known Structured Query Language (SQL) together with any parameter (or attributes) information into a format (of one or more packets) suitable for communications between client devices 108, third party platforms 110, network-based social-marketplace platform 102, and or conventional network-based social-media platform 202. To facilitate online transactions between network-based social-marketplace platform 102 and client devices 108, third party service provider platforms 110, also through server computers, may be coupled to network 104. Third party platforms 110 may represent advertisement providers, financial or authorized institution, such as a bank, a credit card authority or an agent and etc. The financial entities provide mechanisms for network-based social-marketplace platform 102 to verify various information submitted by client device 108 for a transaction or to electronically proof information/data required by network-based social-marketplace platform 102 from client devices 108. Third party advertiser providers may provide ads to network-based social-marketplace platform 102 to be rendered by client devices 108.

One or more embodiments of the present invention provides network-based social-marketplace platform 102 that facilitates and promotes commerce between related accounts of client devices 108 using various aspects of one or more network-based social media platforms 202 with which the network-based social-marketplace platform 102 may be associated but without affecting the network-based social media platforms 202. Accordingly, one or more embodiments of the present invention provides a system and method for facilitating commerce between individual client devices 108 with preexisting relationship on network-based social-media platforms 202 and more particularly, a system and a method that provides a host computing platform 102 to enable related client devices 108 to transact products, with an embodiment of the present invention associating the host platform 102 with a network-based social platform 202 (further detailed below).

This disclosure defines a seller as one or more entity that promotes (e.g., using coupons), exchanges, or sells product(s). Non-limiting examples of a seller may include, for example, an individual, a vendor, retailer, merchant, wholesaler, dealer, resellers or value added resellers (or VARs), professional entities such as accountants, attorneys, etc.

This disclosure defines a buyer as one or more entity that may be involved in a transaction with a seller. Non-limiting examples of a buyer may include, for example, an individual, a purchaser of a product or service, consumer, purchasing entity such as a corporation, etc.

In addition, in certain instances (depending on the context used) a seller may become a buyer or vice versa. For example, a merchant is a seller, but a merchant may buy from their respective vendor and hence, the merchant becomes a buyer. As another example, a buyer may sell a product, which makes the buyer a merchant or seller.

The terms "buy," "sell," "trade," "give away," and so on may also be referred to simply as "transact" or derivatives thereof such as "transaction," which may or may not include the use of currency (or money). For example, giving away a product for free or bartering is a transaction between entities (e.g., seller and buyer) that does not include the use of currency.

This disclosure defines the term "product" or "products" as good(s) and or service(s) (virtual or real) provided by an entity. Accordingly, a "product" for manufactures may for example, be an article, whereas a "product" for an attorney or an accountant may be the service provided.

Further, in certain instances (depending on the context used) the term "user" or "end user" may refer to buyer, seller, and or an entity.

The present invention defines the interchangeable phrases "active client device(s) 108a" or "browsing client device(s) 108a" as client devices 108 that have an account with and are actually logged onto, connected with, and may be active on network-based social-market place 102. Further, the present invention defines "related client device(s) 108*b*" as client devices 108 that have an account on network-based social-marketplace platform 102 and are related, networked with, or have a pre-existing relationship with browsing client device 108*a* on network-based social-market place 102 (viewed from the point of browsing client device 108*a*). According, the combination of browsing client device 108*a* and any other client device 108 related to browsing client device 108*a* form related client devices 108*b*. It should be noted that any client device 108 that has an account on network-based social-marketplace platform 102 that is related, networked with, or has a pre-existing relationship with another account of another client device 108 (be it browsing client device 108*a* or others) also form related client devices 108*b*. Therefore, as an example, a first and second client devices 108 may be related, but only the second client device 108 may be related to a third client device 108 and hence, first and second client devices 108 form related client devices 108*b* and second and third client devices 108 form related client devices 108*b*, but not first and third client devices 108. In addition, the present invention defines "networked client device(s) 108*c*" as those client devices 108 that have an account on network-based social-media platform 202 and are related, networked with, or have a pre-existing relationship with other client devices 108 on network-based social-media platform 202.

One or more embodiments of the present invention for network-based social-marketplace platform 102 use electronic records for management and tracking of various aspects and functions of the social-marketplace. A record is a number of related items of information that are handled as a unit. Electronic records include parameters, properties, or attributes that relate to specific aspects of the social-marketplace, with values (i.e., non-transitory electronic data) that define the attributes. It should be noted that the number of attributes for any electronic record presented in accordance with the present invention may vary depending on many factors, including for example, whether network-based social-marketplace platform 102 is associated with network-based social-media platform 202. Further, a value that defines an attribute for any electronic record may be defined by any type of non-transitory data, non-limiting, non-exhaustive listings of which may include files, image, audio, video, or non-transitory data that point to other non-transitory data, other electronic records, or even external systems (external to network-based social-marketplace platform 102).

Figure 1D:
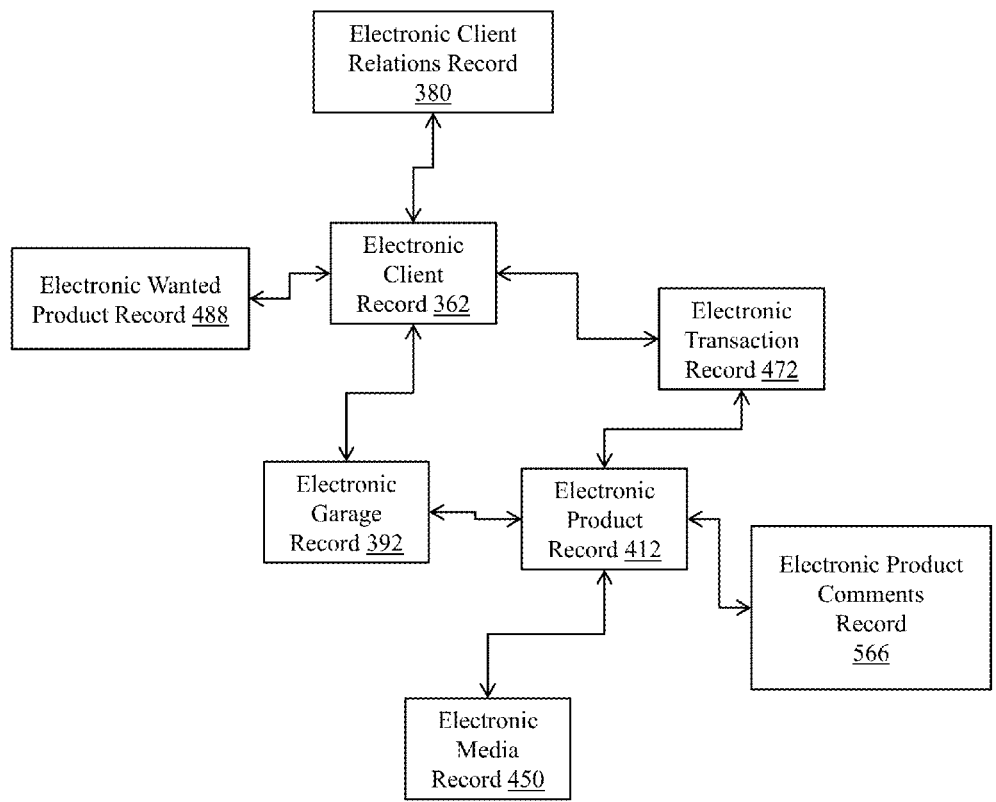
FIG. 1D is a non-limiting, exemplary systems overview illustration of various electronic records and their relationships in accordance with one or more embodiments.

Electronic records may be implemented by a variety of mechanisms, non-limiting example of which may include the use of databases that reside on computing machines. The present invention defines a database as a structured set of non-transitory data that may or may not use or even be in a table format that are stored in one or more computing machine, accessible by various means. Non-limiting examples of various well-known conventional database systems that may be used to implement electronic records may include, for example, well-known, conventional relational databases, flat file databases, Extensible Markup Language (XML) databases, or others, or combinations thereof. FIG. 1D is non-limiting, exemplary systems overview illustrations of electronic records used in accordance with one or more embodiments of the present invention, each of which are detailed below. It should be noted that any one or more GUI dialog boxes, displays, or various other GUIs illustrated throughout the present invention may provide content culled from different electronic records shown in FIG. 1D, which are rendered by client devices 108 in well-known and conventional manner.

One or more embodiments of the present invention provide network-based social-marketplace platform 102 that enables commerce via client devices 108 with accounts that have preexisting networked relationships on a particular networking platform. For example, friends, family, or a group members or organizations that are members or have registered accounts that are networked on a social-media platform 202 may transact with one another on network-based social-marketplace platform 102. That is, individual client devices 108 that have accounts with preexisting relationships may transact, similar to familiar neighbors transacting in a neighborhood garage or yard sales.

Figure 13:
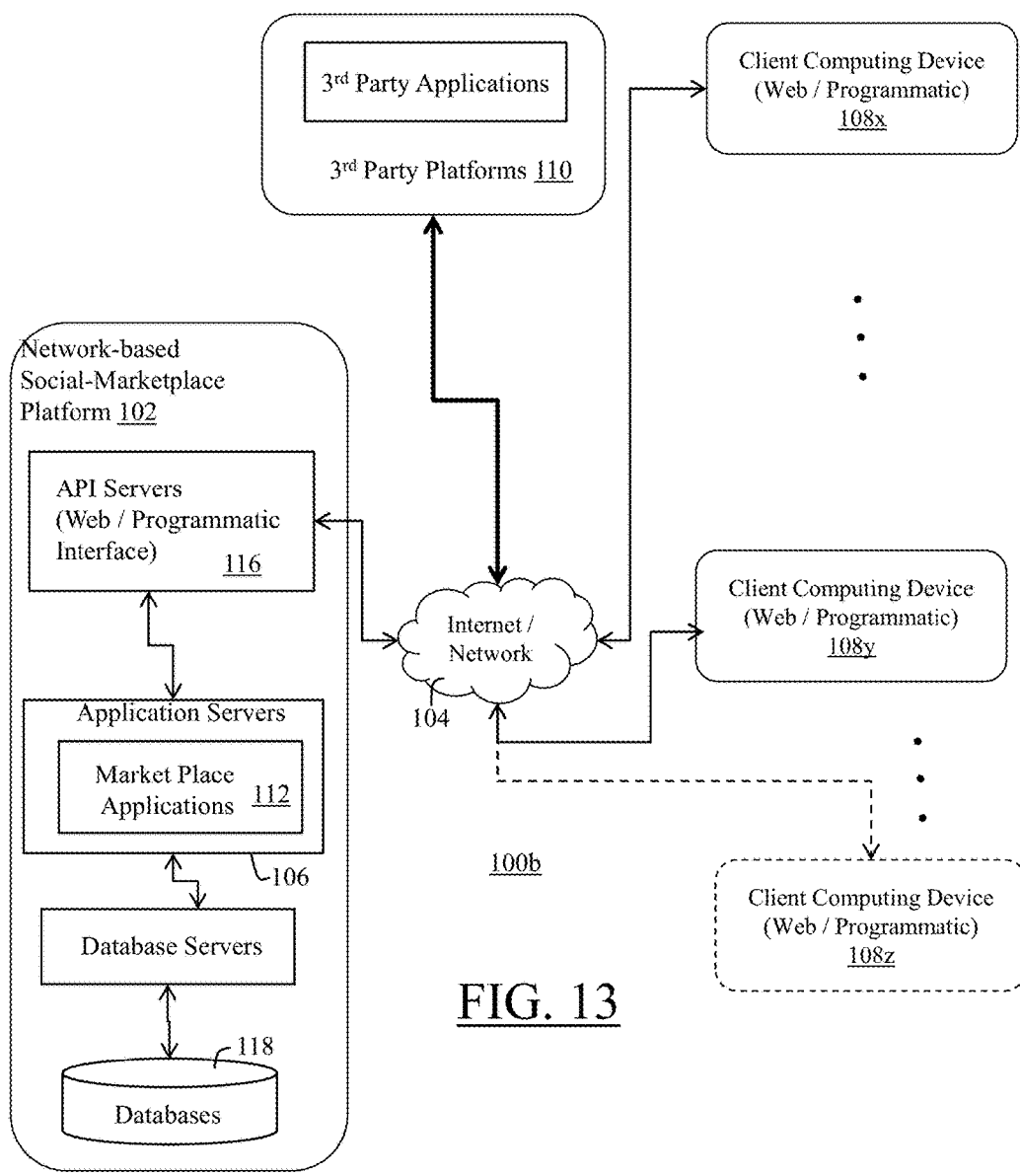
FIG. 13 is a non-limiting, exemplary illustration of a general overview of a system architecture for implementing another of one or more embodiments of the present invention.
Figure 14:
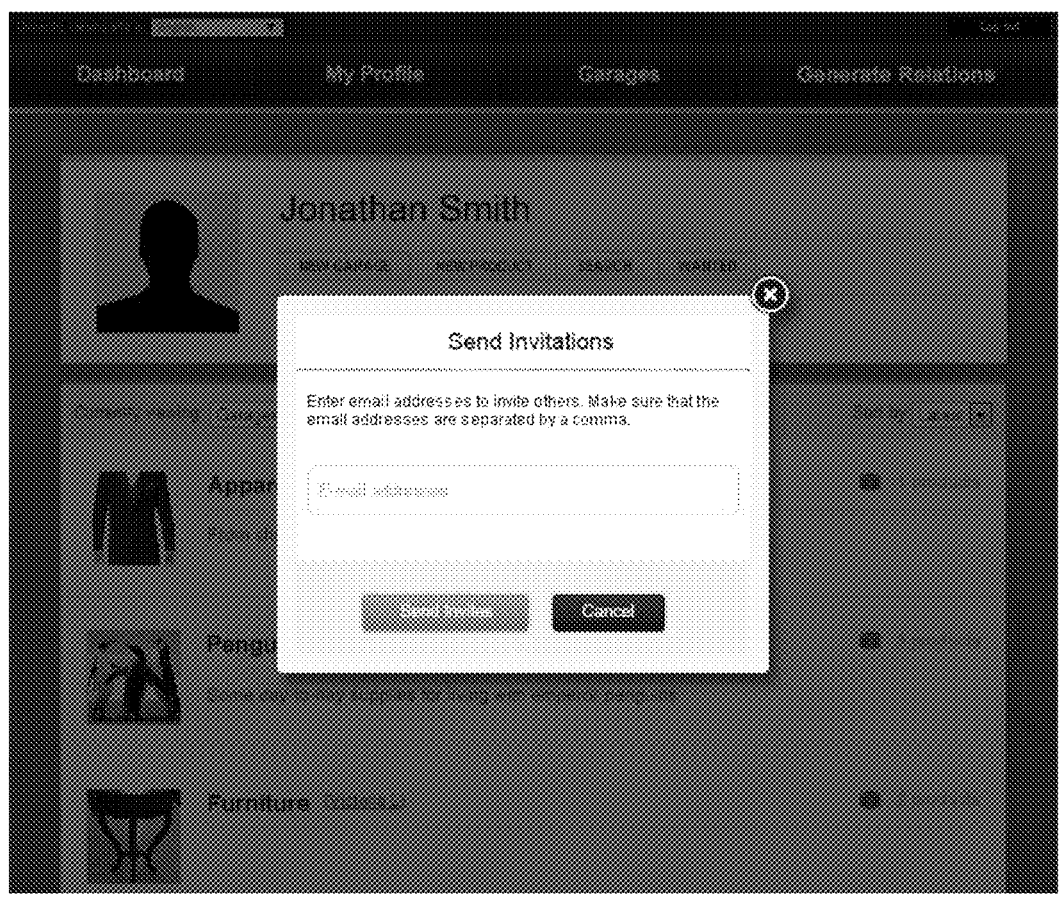
FIG. 14 is a non-limiting, exemplary illustration for invitations in accordance with one or more embodiments of the present invention.

One or more embodiments of the present invention may use networked client devices 108*c* of network-based social-media platform 202 to generate and establish the relationships on network-based social-marketplace platform 102 or simply, the networking relationships may be generated and established by invitation and or referrals using network-based social-marketplace platform 102 as standalone system, without the use of network-based social-media platform 202 (further detailed below in relation to FIGS. 13 and 14).

As illustrated in FIG. 1C, one or more embodiments of the present invention include a social-marketplace application 112 on application servers 106, which provides combinations of various features and functions that may be found on network-based social media platform 202 and a commerce platform to client devices 108 where friends, family, a group or organization, etc. may transact products with one another (similar to familiar neighbors in a neighborhood a garage sale) while excluding those with no networking relationships from commerce.

The social features or aspects (e.g., "relationships," "friends," "family," "a group," or "organization," etc.) of network-based social-marketplace platform 102 may be implemented by a variety of mechanism. Non-limiting examples of such mechanisms may include subscription, invitation, referrals, and or association of network-based social-marketplace platform 102 with network-based social-media platform 202 that already has one or more sets of networked accounts of networked client devices 108*c* (that are related and are viewed and known as "friends," or the like). For simplicity and discussion purposes, one or more embodiments of the present invention is described using well established, conventional network-based social-media platforms 202 such as FACEBOOK® or GOOGLE+® to implement various social features (or the underlying "social" connection or network between individual accounts of client devices 108). However, as detailed in FIGS. 13 and 14, one or more embodiments of the present invention may very well be practiced without using network-based social-media platform 202. In other words, as further detailed below in relation to FIGS. 13 and 14, network-based social-marketplace platform 102 may independently provide tools that enable features and functionalities provided by network-based social-media platform 202. Accordingly, any feature and or functionality described herein that is provided by network-based social media 202 may be replaced and implemented independently within network-based social-marketplace platform 102 without the use or need of network-based social-media platform 202 (as detailed below). However, the use of network-based social media platform 202 is advantageous in that some required features and or functionalities already exist within network-based social media platform 202 and may be readily accessed and used using various well-known Application Programming Interfaces (APIs) 114 provided by network-based social-media platform 202.

As best illustrated in FIG. 1C, network-based social-marketplace platform 102 may be associated with network-based social-media platform 202 via each other's respective API 116 and 114. That is, network-based social-marketplace platform 102 associated with network-based social-media platform 202 allows networked client devices 108c with preexisting relationships on network-based social-media platform 202 to connect with one another on network-based social-marketplace platform 102 and list products to be transacted with one another. In other words, networked client devices 108c that have been deemed related (or networked) by network-based social-media platform 202 may transact with one another on network-based social-marketplace platform 102 (further detailed below).

In one or more embodiments, network-based social-marketplace platform 102 is able to determine which client devices 108 are related (or have pre-existing relationship) by accessing and using API 114 of network-based social-media platform 202. That is, as further detailed below, network-based social-media platform 202 provides a list of accounts of networked client devices 108c with user profiles that are associated (e.g., having pre-existing relationship) with browsing client device 108a on network-based social-media platform 202. The provided list of relations (that include user profiles) is manipulated and modified as detailed below and stored within an electronic client relations record 380 of network-based social-marked place 102 and associated with client profile 364. Client devices 108 in client relations record 380 of browsing client device 108a become the related client devices 108b. Client relations record 380 enables browsing client device 108a to transact on network-based social-marketplace platform 102 with other related client devices 108b while excluding non-related client devices 108.

A new account may be established with network-based social-marketplace platform 102, which would generate client profile information 364 within electronic client record 362 (FIG. 2C) for that account in accordance with an embodiment of the present invention. For example and as further detailed below in relation to FIGS. 2A and 2B, a new user with an already established account with network-based social-media platform 202 may easily access network-based social-marketplace platform 102 through a variety of means (detailed below) and establish a new account, which would enable network-based social-marketplace platform 102 to generate a client profile information 364 within the electronic client record 362 for the new user.

Figure 2A:
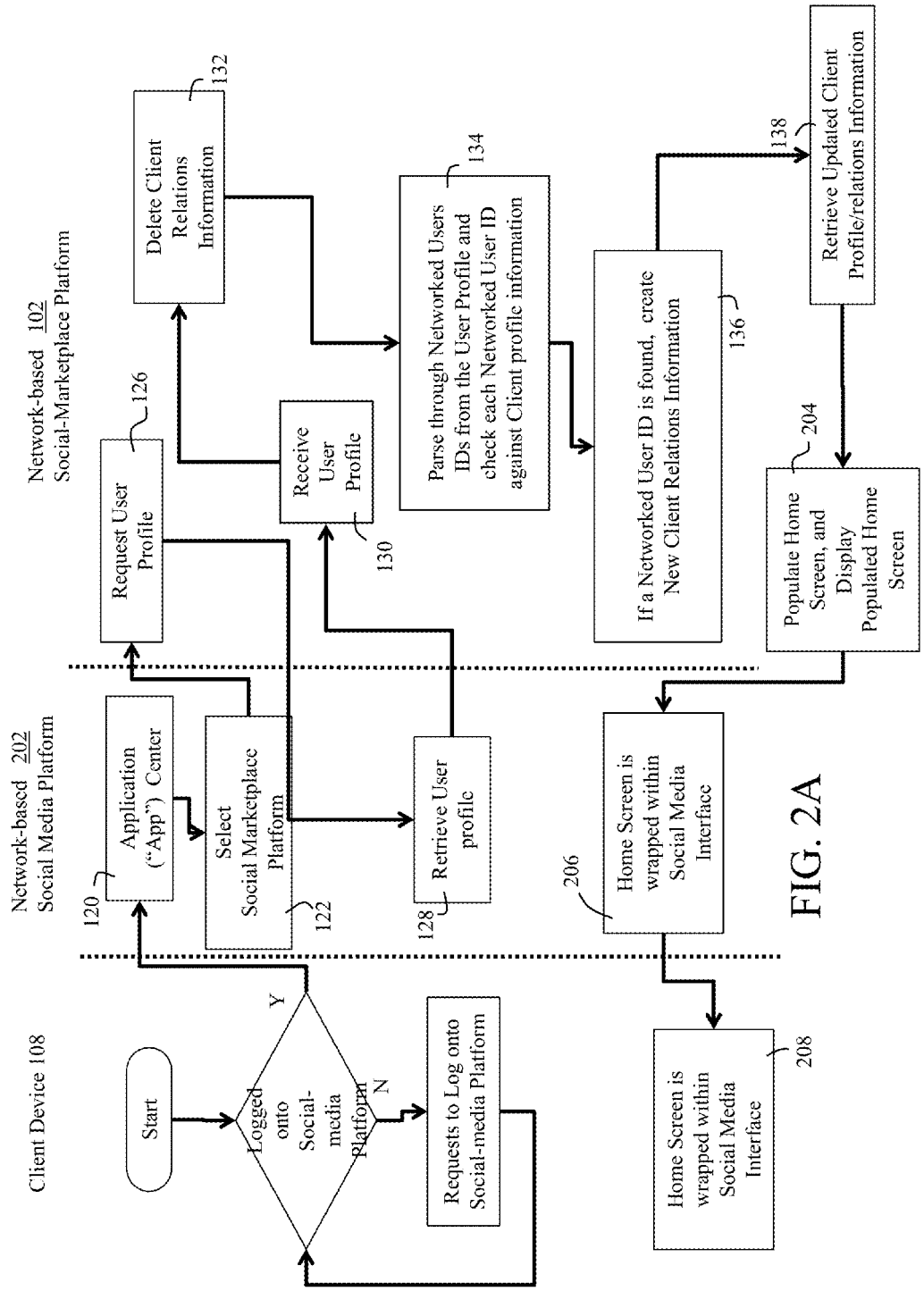
FIGS. 2A and 2B are non-limiting, exemplary flow diagrams that illustrate the process of establishing an account or accessing network-based social-marketplace platform in accordance with one or more embodiment of the present invention.
Figure 2B:
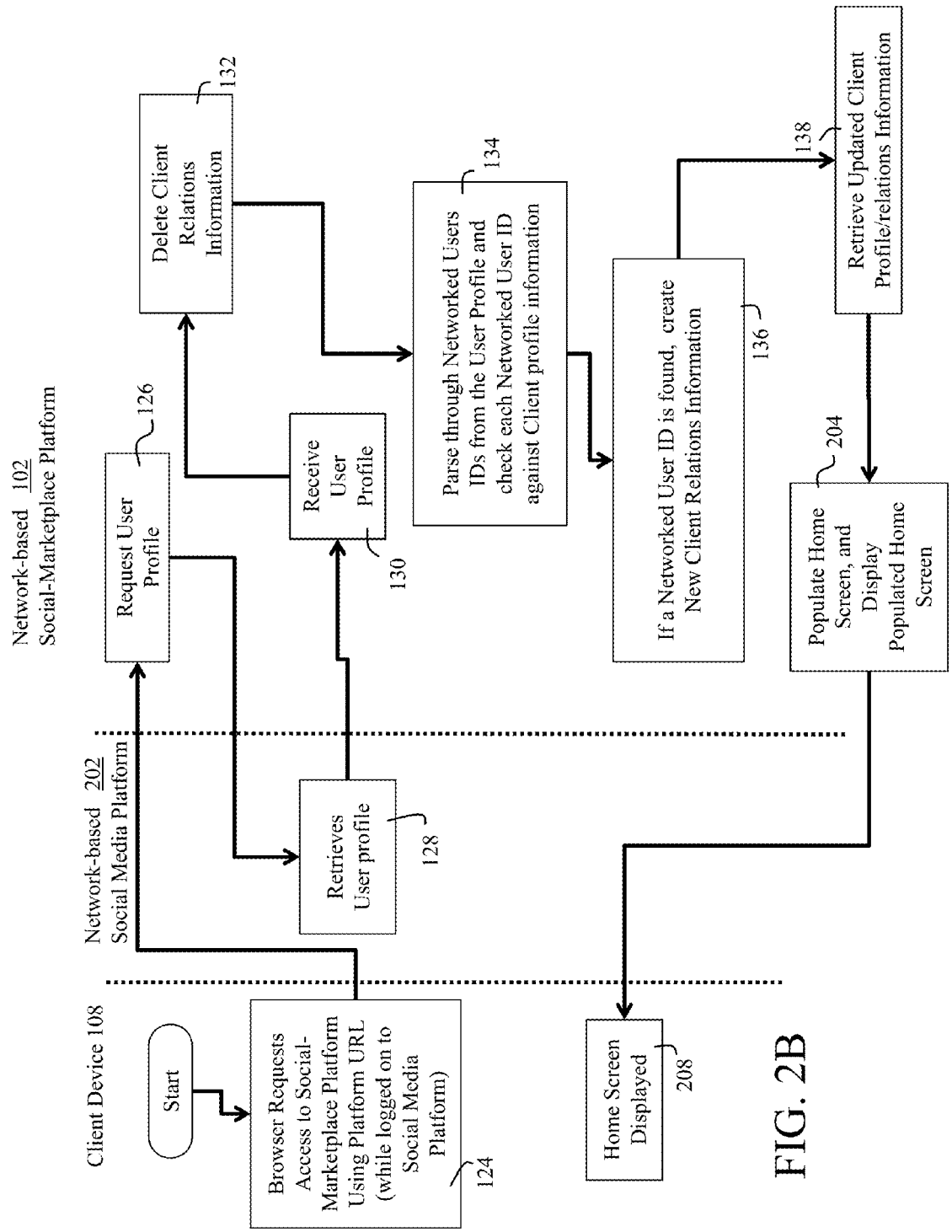
Figure 2C:
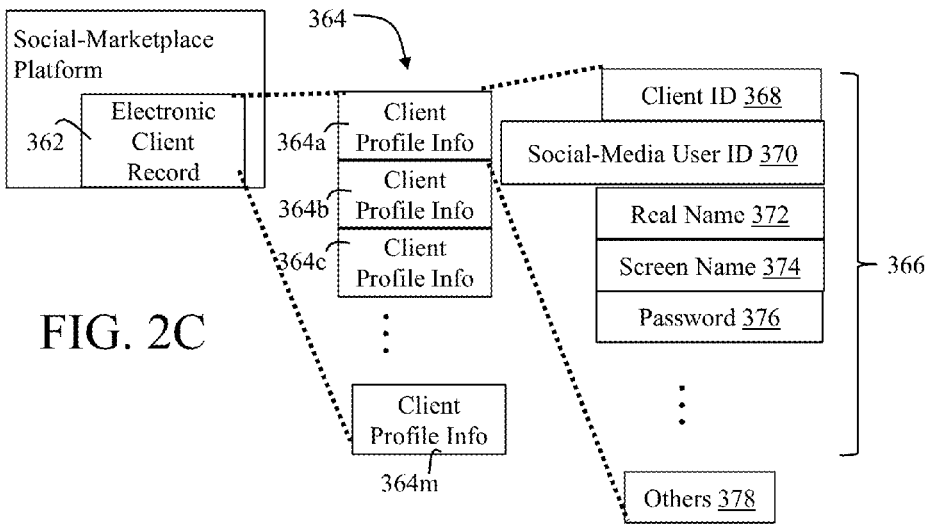
FIG. 2C is a non-limiting, exemplary systems overview illustration of an electronic client records in accordance with one or more embodiments of the present invention.

As best illustrated in FIG. 2C, the electronic client record 362 may include one or more client profile information 382 of client accounts on network-based social-marketplace platform 102. Client profile information 364 of client record 362 is therefore associated with an account accessed by client device 108 that may include a number of related items of information about the accessed account. Client record 362 enables networked-based social-marketplace platform 102 to recognize or identify the account associated with client device 108. Accordingly, the electronic client record 362 may include one or more client profile information 364, with each client profile information 364 having attributes 366 the values of which define client profile information 364 of client record 362. Non-limiting, non-exhaustive listing of attributes 366 for client profile information 364 in accordance with one or more embodiments may include:

Client ID 368, which is a globally unique identifier of an account on networked-based social marketplace platform 102 associated with a client.

Social-media User ID 370—is a globally unique identifier of an account on a networked-based social-media platform 202 associated with a user of networked-based social-media platform 202. It should be noted that if network-based social-marketplace 102 is not associated with network-based social-media platform 202 (FIGS. 13 and 14), social-media user ID 370 will not be required.

Real Name 372

Screen (or user) Name 374

Password 376

One or more embodiments of the present invention are implemented so that network-based social-marketplace platform 102 requires authentication with network-based social-media platform 202 via API 114 for establishment of an account or simply access to network-based social-marketplace platform 102 by client device 108. Therefore, in one or more embodiments, if client device 108 does not have a network-based social-media platform 202 authentication, client device 108 may be redirected to network-based social-media platform 202 and prompted with a well-known and conventional login dialog box.

Figure 3:
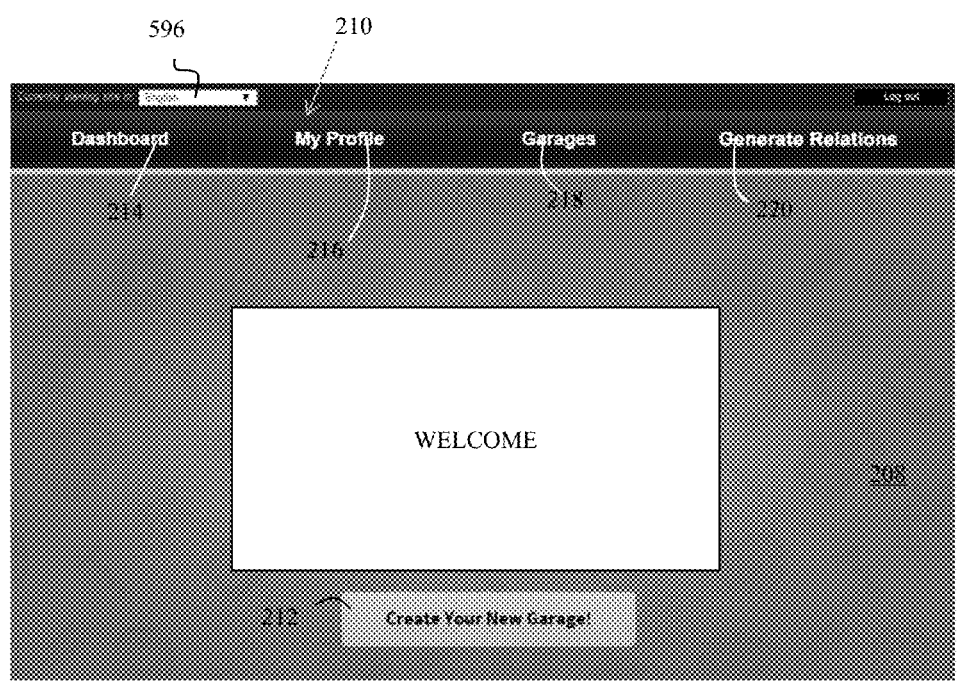
FIG. 3 is a non-limiting, exemplary illustration Graphic User Interface (GUI) for a home screen in accordance with one or more embodiments of the present invention.

FIGS. 2A and 2B are non-limiting, exemplary flowcharts that illustrate the process of establishing an account or accessing network-based social-marketplace platform 102 either via network-based social-media platform "app center" (FIG. 2A) or directly via network-based social-marketplace platform Universal Resource Locator (URL) shown in FIG. 2B. Referring to FIGS. 2A and 2B, in one or more embodiments, establishing an account or accessing network-based social-market platform 102 may require client device 108 to be logged onto network-based social-media platform 202 with which network-based social-marketplace platform 102 may be associated. In one embodiment, establishing an account or accessing network-based social-marketplace platform 102 may include first logging onto network-based social media platform 202, enabling access to "app center" operations 120 (FIG. 2A) where client device 108 using client device browser may search and select a link to social-marketplace application 112 at operation 122, which directs client browser to social-marketplace application 112 of network-based social-marketplace platform 102 (FIG. 3). It should be noted that the manner of logging onto network-based social-media platform 202 is well known, including access to application center operation 120 thereof. Further, the manner of searching and selecting operations 122 for network-based social-marketplace platform 102 is also well known.

As further illustrated in FIG. 2B, in one or more embodiments, if client device 108 is already logged onto network-based social-media platform 202, network-based social-marketplace platform 102 may be directly accessed to use or establish a new account using the URL associated with network-based social-marketplace platform 102 at operation 124 in well-known manner. The use of URL directs client device browser to social-marketplace application 112 of network-based social-marketplace platform 102 (shown in FIG. 3). Accordingly, a client device 108 that is already logged onto network-based social-media platform 202 may access network-based social-marketplace platform 102 via app center operations 120 of network-based social-media platform 202 or directly using the URL of network-based social-marketplace platform 102 at operation 124.

When a client device 108 is successfully authenticated against network-based social-media platform 202 and requests access at operations 122 and or 124 to network-based social-marketplace platform 102, network-based social-marketplace platform 102 forwards a request for user profile of browsing client device 108a at operation 126 (via API 116) to network-based social-media platform 202 for retrieval of user profile at operation 128, which is handled by API 114. It should be noted that request user profile operation 126 by network-based social-marketplace platform 102 is processed for establishment of a new account as well as access to network-based social-marketplace platform 102 with an already established account. In other words and as detailed below, request user profile operation 126 is processed even after an account is established and whenever the browsing client accesses an established account on network-based social-marketplace platform 102. It should further be noted that the user profile being retrieved by network-based social-media platform 202 at operation 128 belongs to browsing client device 108a that has an account on network-based social-media platform 202.

User profile being retrieved at operation 128 is well-known and conventional electronic record of information related to a conventional account of a user on networked-based social-media platform 202. Accordingly, user profiles are electronic records that are generated by social-media platform 202 that may be used by network-based social-marketplace platform 102. In general, the user profile may include the following attributes that may be used by network-based social-marketplace platform 102:

Social-media user identification 370, which uniquely identifies the account associated with a single user on network-based social-media platform 202;

a screen or user name;

real name of the user; and a list of networked social-media user identifications of other networked user accounts networked with an account of a user. The list of networked social-media user identifications includes social-media user IDs that are networked with the account of the single user based on a predetermined criteria set forth by network-based social-media platform 202. For example, the list of networked social-media user identifications may include users IDs of all the accounts connected with networked client devices 108c that are networked with the account of browsing client device 108a on network-based social-media platform 202.

Referring back to FIGS. 2A and 2B, network-based social media platform 202 retrieves the user profile associated with the account of browsing client device 108a on the network-based social-media platform 202 at operation 128 and forwards the user profile to network-based social-marketplace platform 102 via API 114. Network-based social-marketplace platform 102 receives the user profile at operation 130, where it is manipulated (detailed below) to generate client relations information 382 of the electronic client relations record 380 (FIG. 2D) for network-based social-marketplace platform 102. Accordingly, a client relations information 382 of client relations record 380 is generated by networked-based social-marketplace platform 102 from the user profile of the account associated with browsing client device 108a, which is received from network-based social-media platform 202.

As further illustrated in FIGS. 2A and 2B, network-based social-marketplace platform 102 receives user profile from network-based social-media platform 202 at operation 130 and generates a new client relations information 382 for client relations record 380 (FIG. 2D) for the received user profile at operations 132 to 138 each time client device 108 requests access to network-based social-marketplace platform 102. This enables the maintenance of client relations record 380 to include updated relations information between client devices 108 on the network-based social-marketplace platform 102. For example, if a first client account is no longer associated with a second client account on network-based social-media platform 202, the newly generated client relations information 382 of client relations record 380 will be automatically updated, deleting or severing the networked relationship between the two client accounts on network-based social-marketplace platform 102.

Figure 2D:
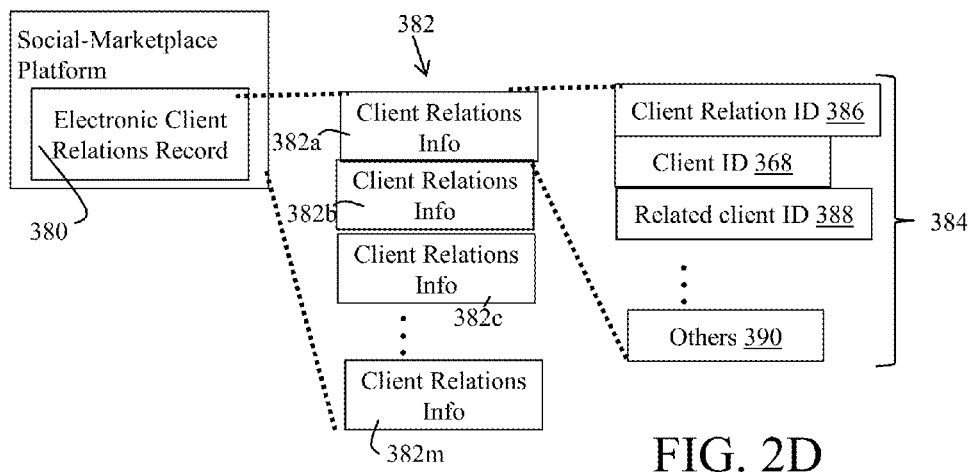
FIG. 2D is a non-limiting, exemplary systems overview illustration of an electronic client electronic records in accordance with one or more embodiments of the present invention

As best illustrated in FIG. 2D, the electronic client relations record 380 includes client relations information 382 of a client on network-based social-marketplace platform 102. Client relations information 382 of client relations record 380 is therefore associated with an account of a client device 108 that may include a number of related items of information about related accounts of related client devices 108b that are related to an account of browsing client device 108a. Client relations information 382 of client relations record 380 enables networked-based social-marketplace platform 102 to recognize or identify all accounts of related client devices 108b that are related to the account of browsing client device 108a on networked-based social-marketplace platform 102. Accordingly, client relations record 380 may include one or more client relations information 382, with each client relations information 382 having attributes 384 the values of which define the client relations information 382 of client relations record 380. Non-limiting, non-exhaustive listing of attributes 384 for a client relations information 382 may include:

Client relation ID 386, which is a globally unique identifier that specifically identifies the relationship between client accounts. Client relations ID 386 may be used as an identifier (a "counter") to ensure that only one relation between the account of client "A" and the account of client "B" exist in the database.

a client ID 368, which is used to associate client relations information 382 of client relations record 380 with client profile information 364 of client record 362.

a related client ID 388 is also a globally unique identifier of an account of a specific related client device 108b.

Referring back to FIGS. 2A and 2B, in particular, when network-based social-marketplace platform 102 receives user profile at operation 130, network-based social-marketplace platform 102 deletes client relations information 382 of client relations record 380 for that specific client profile information 364 even if client relations information 382 of client relations record 380 is empty (which may be the case for a new account) at operation 132. Network-based social-marketplace platform 102 then parses through the list of networked social-media user IDs in the user profile and checks each against each social-media user IDs 370 in each client information profile 364 in client record 362 of network-based social-marketplace platform 102 at operation 134. If a matched networked user ID (from user profile) exists in client record 362, then client relations record 380 is updated with new client relations information 382 for the specific client ID 368 at operation 136. For example, when John accesses network-based social-marketplace platform 102 via browsing client device 108a, user profile for John is received from the network-based social-media platform 202, which includes all of John's exiting relationships (e.g., John friends users IDs on FACEBOOK®). Client relations information 382 of client relations record 380 for John on network-based social-marketplace platform 102 is deleted (if any exists), and network-based social-marketplace platform 102 parses through John friends' networked user IDs of the received user profile to determine if any of John's friends networked users IDs exist in client electronic record 362 of network-based social-marketplace platform 102. If a networked user ID of a friend of John (e.g., Jane's user ID on FACEBOOK®) is found in client record 362 (as the social-media user ID 370), the network-based social-marketplace platform 102 generates a new client relations information 382 for John, saving networked user ID of the friend (e.g., Jane's social-media user ID 370) as related client ID 388 (FIG. 2D) and John's client ID 368, thusly, establishing a relationship between the two accounts (i.e., browsing client device 108a and related client device 108b) on network-based social-marketplace platform 102. If John's account on social-media platform 202 is no longer networked with an account of a particular user (e.g., Jane) on network-based social-media platform 202, when John logs on to network-based social-marketplace platform 102, that friend's user ID (Jane's user ID) will not be generated in John's client relations information 382 as it will not be in John's user profile and hence, when the client relations information 382 is regenerated, John's account will no longer be related with Jane's account on network-based social-marketplace platform 102. Therefore, to establish a relationship (networking) between accounts of a first and a second client device in accordance with one or more embodiments, both devices must have a pre-existing relationship (networking) on a network-based social-media platform 202, and at least one of the two must have an established account in network-based social-marketplace platform 102 in accordance with an embodiment of the present invention.

The resulting client profile information 364 and client relations information 382 may later be used to populate a home screen page 208 (FIG. 3) at operation 204 that is displayed by a client browser of browsing client device 108a. As illustrated in FIGS. 2A and 2B, network-based social-marketplace platform 102 retrieves the updated client profile/relations information 364/382 at operation 138 to populate home screen 208 at operation 204. Home screen 208 may be wrapped within social-media interface at operation 206 (FIG. 2A) and forwarded onto browsing client device 108a via network-based social-media platform 202 or, alternatively, home screen 208 may be directly forwarded onto browsing client device 108a without a wrapper interface. It should be noted that for a new account, generate relations (detailed below in relation to FIGS. 7A-7D) must be used to actually add new relations.

FIG. 3 is a non-limiting, exemplary illustration GUI for a home screen in accordance with one or more embodiments of the present invention, which may be access by new or established accounts. As exemplarily illustrated, network-based social-marketplace platform 102 includes a home screen (or a splash screen) 208 that contains main navigational menu bar GUI 210, which is rendered by the browser of client device 108 (e.g., a browsing client device 108a). Main navigational menu bar 210 enables clients device 108 to generate a garage 258 for a garage sales via Create Garage GUI icon 212, which prompts immediate interaction from browsing client devices 108a with new accounts. As illustrated, main navigational menu bar GUI 210 includes several menu items, which are described below.

In general, GUI icons provided by the home screen 208 include a Dashboard GUI icon 214 that directs the browser of client devices 108 to view updates (in a form of a newsfeed 228) of garage 258 (of related client devices 108b), products 260, or other elements from related client devices 108b. The main navigational menu bar 210 also includes a My Profile GUI icon 216 that directs the browser of client device 108 to client profile display 244 where any number of data may be updated and modified (detailed below).

Figure 6A:
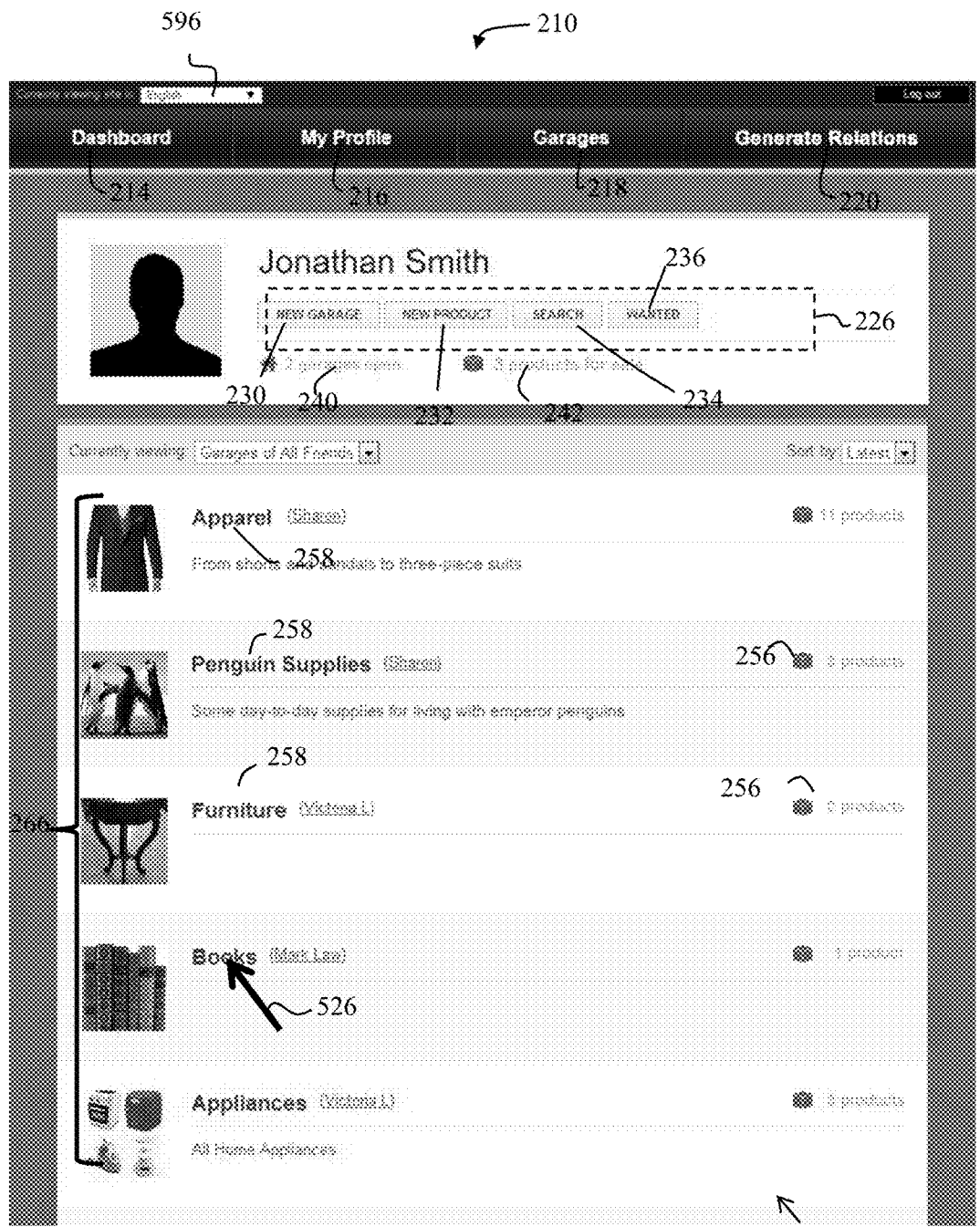
FIG. 6A is a non-limiting, exemplary GUI illustration of a garage listing display in accordance with one or more embodiment of the present invention.

Main navigational menu bar 210 also includes a Garages GUI icon 218 (for garage sales) where browser of client devices 108 may be directed to view a garage 258 of related client devices 108b (e.g., FIG. 6A). In one embodiment, a generate relations GUI icon 220 enables browsing client devices 108a to communicate with network-based social media platform 202 to invite client devices 108 that are networked or related on network-based social-media platform 202 to become related client devices 108b on the network-based social-marketplace platform 102. As detailed below, client devices 108 may be related on the network-based social-media platform 202 (as networked client devices 108c), but not necessarily related on network-based social-marketplace platform 102. Accordingly, as detailed below, the generate relations GUI icon 220 in one embodiment enables browsing client devices 108a to select and invite networked client devices 108c that are related to the browsing client device 108a on network-based social-media platform 202 to also be associated through the network-based social-marketplace platform 102 and become related client devices 108b with the browsing client device 108a. As further illustrated in FIG. 3, content provided by network-based social-marketplace platform 102 may be displayed and rendered by client device 108 in different languages by using a pull-down menu GUI 596. When a request is made to view content in another language, the network-based social-marketplace platform 102 returns content translated to the desired language via a third-party platform in a well-known and conventional manner.

Figure 4:
FIG. 4 is a non-limiting, exemplary GUI illustration of a dashboard display in accordance with one or more embodiments of the present invention.

FIG. 4 is a non-limiting, exemplary GUI illustration of a dashboard display 224 in accordance with one or more embodiments of the present invention. The dashboard display 224 is rendered by the browser of client device 108 after selection of the menu item GUI icon labeled dashboard 214 from main navigational menu bar 210. In particular, client device 108 through the client device browser transmits a request (for example, by selecting a GUI icon such as a "Dashboard" GUI 214) to network-based social-marketplace platform 102 to access dashboard display 224. Network-based social-marketplace platform 102 receives browsing client device 108a request and forwards dashboard display 224 to browsing client device 108a, which may be rendered by the browser of client device 108 as exemplarily illustrated in FIG. 4.

Dashboard display 224 exemplarily illustrated in FIG. 4 serves as an area that allows browsing client devices 108a via a browser to access shortcuts to common pieces of functionality that are used on network-based social-marketplace platform 102. Dashboard display 224 may comprise of main navigational menu bar GUI 210 and a secondary navigation bar GUI 226. Non-limiting, non-exhaustive listing of secondary navigations menu items may include new garage GUI icon 230 for creating a new garage 258 by browsing client device 108a for a garage sales. New product GUI icon 232 may be used to add products 260 in existing garage 258 intend for transaction. Search GUI icon 234 enables browing client device 108a via client browser to search for products 260 of related client devices 108b. Wanted GUI icon 236 may be used to add wanted products 262, similar to a "wanted ad." The Dashboard display 224 may also include a garage count 240 of the total number of garages 258 of browsing client device 108*a* and a product count 242 for total number of products 262 of browing client device 108*a*.

Dashboard display 224 may further include a newsfeed 228 that may comprise of postings of products or wanted ads by related client devices 108*b*. In other words, the newsfeed 228 displays a list of recent activity that has been conducted by related client devices 108*b*. This includes activities listing such as creation of a new garage 258 by a related client device 108*b*, or whenever a new product 260 is provided for transaction by some related client device 108*b*, or even a wanted ad 262 that is posted by the same or some other related client device 108*b*. Regarding newsfeed 228, content of newsfeed 228 is managed by network-based social-marketplace platform 102, which searches database 118 for accounts of related client devices 108*b* that have relationship with the account of browsing client device 108*a*, and displays the latest activates (postings) of only those accounts that have a preexisting relationship with the browsing client device 108*a*. In other words if respective accounts of a first and a second client devices 108 do not have a relationship their postings will not show in their respective newsfeed 228.

Figure 5A:
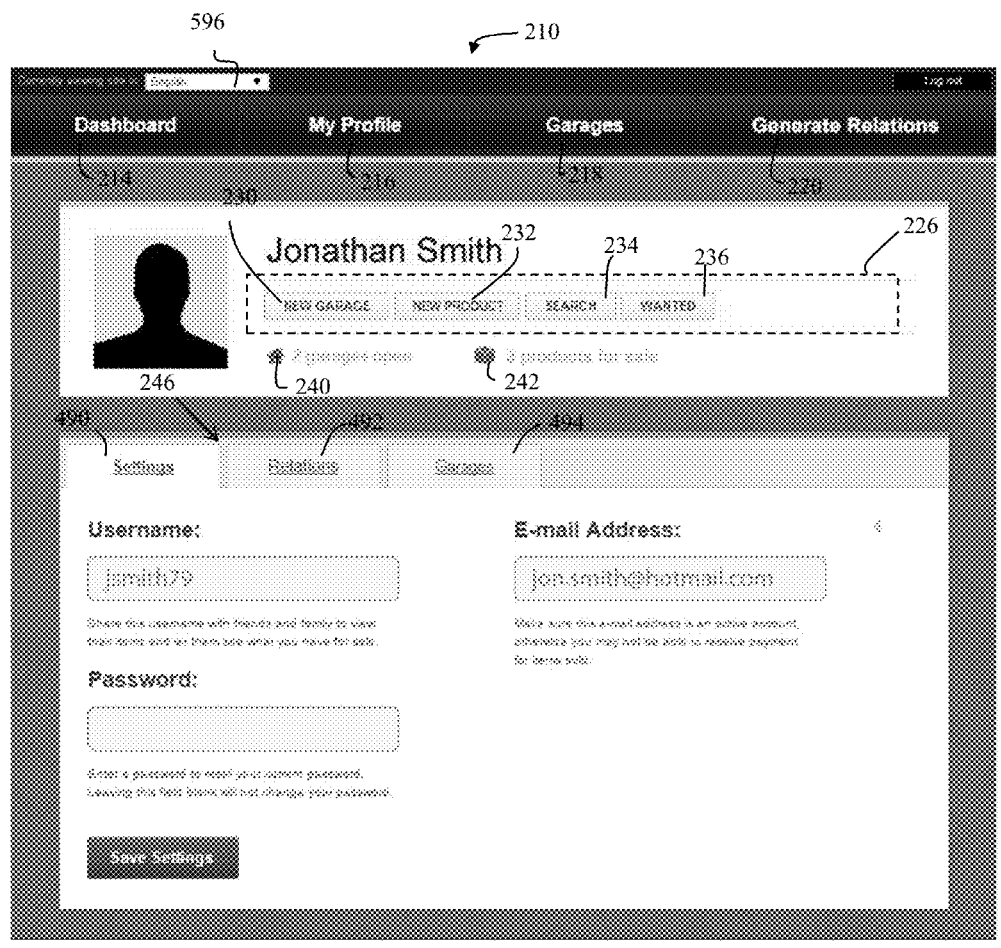
FIGS. 5A to 5C are a non-limiting, exemplary illustrations of "My Profile" GUI display in accordance with one or more embodiments of the present invention.
Figure 5B:
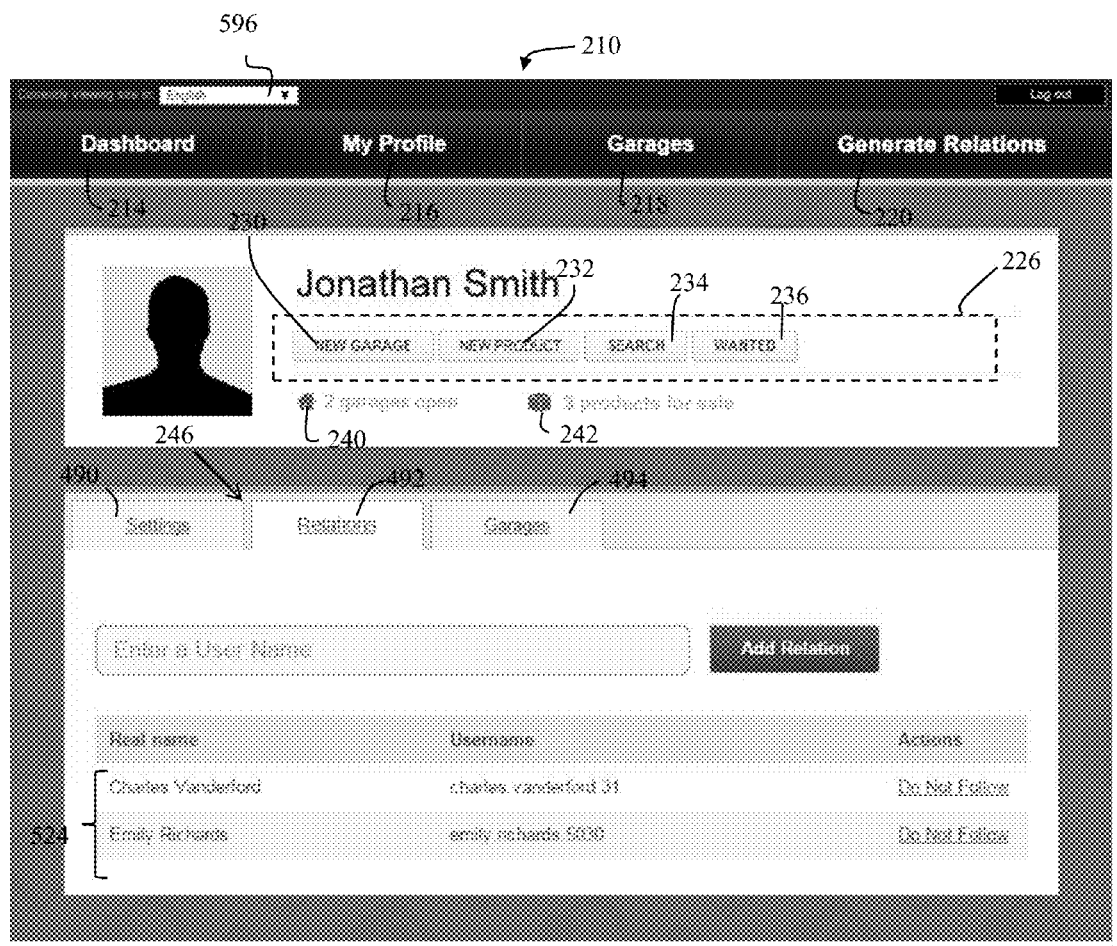
Figure 5C:
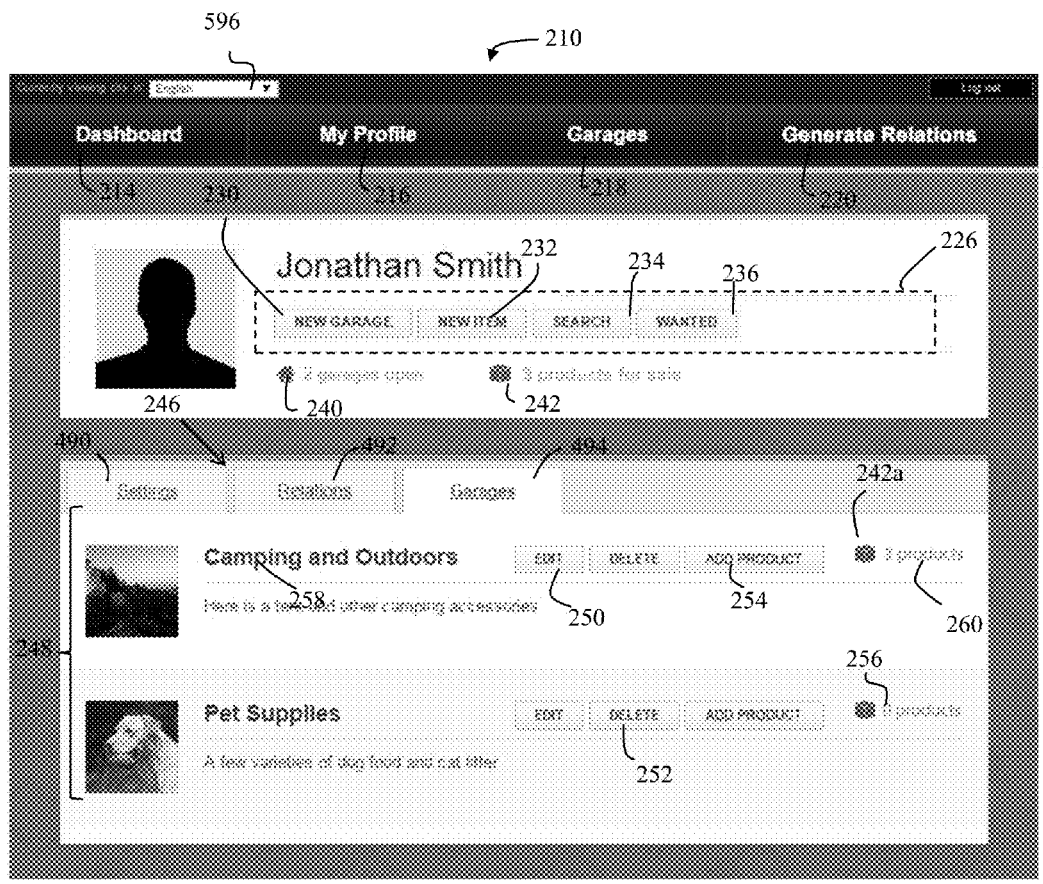

FIGS. 5A to 5C are a non-limiting, exemplary illustrations of "My Profile" GUI display 244. Selecting My Profile menu item GUI icon 216 from main navigational menu bar 210 enables access to My Profile GUI display 244. My Profile display 244 contains a high level view of information that pertains to the account of browsing client device 108*a*. The top portion of the My Profile display 244 contains shortcuts to the common pieces of functionality, similar to the dashboard display 224, including main and secondary navigational menu bars GUIs 210 and 226.

My Profile GUI display 244 may further comprise of one or more folders 246 indicated by settings GUI folder tab 490, relations GUI folder tab 492, and garages GUI folder tab 494, each of which group and isolate respective functionalities of the My Profile display 244 for ease of use. As best illustrated in FIG. 5A, selection of settings GUI folder tab 490 renders and displays the settings functionalities, which may include setting screen name (or username), email address, password, or other well-known functionalities.

As best illustrated in FIG. 5B, selection of relations GUI folder tab 492 renders and displays the relations functionalities, which may include functionality to add or generate a relationship or search existing accounts associated with related client devices 108*b*. The relations GUI folder tab 492 also provides relations list 524 of all accounts associated with related client devices 108*b* that are related to browsing client device 108*a*, which may include real name, username, and recent activities of listed related client device 108*b* as illustrated.

As best illustrated in FIG. 5C, selection of Garage GUI folder tab 494 renders and displays the garage functionalities, which may include a garages list 248 of individual garages 258 of the account associated with browsing client device 108*a*. The garages list 248 of the account associated with browsing client device 108*a* includes names and optional descriptions labeled for each garage 258 as well as product counts 256 that indicate the number of products 260 that are contained for transaction within each garage 258 of browsing client device 108*a*. Garage GUI folder tab 494 also provides the ability to add new products 260 using add new product GUI icon 254 to garage 258, as well as edit a garage 258 via edit GUI icon 250 or delete a garage 258 via delete GUI icon 252 for each individual garage 258 shown in the garage list 248 of the browsing client device 108*a*. It should be noted that a client having an account associated with browsing client device 108*a* may create a garage 258 before generating relations (detailed below) on the network-based social-marketplace platform 102 or may generate relations (detailed below) first and then create a garage 258.

FIG. 6A is a non-limiting, exemplary illustration of a garage listing display in accordance with an embodiment of the present invention. The illustrated garage listing display 264 may be accessed and rendered through selection of garages GUI 218 by browsing client device 108*a*. Garage listing display 264 includes garage listing 266 that lists garages 258 of accounts associated with related client devices 108*b*. Garages 258 appearing on garage listing 266 are determined by the client relations information 382 of browsing client device 108*a* on the network-based social-market place 102.

When garage menu item GUI icon 218 is selected, network-based social-marketplace platform 102 polls database 118, and returns a list of accounts of related client devices 108*b* that have been linked to the account of browsing client device 108*a* in accordance with client relations information 382 of browsing client device 108*a*. According, the network-based social-marketplace platform 102 communicates a list of garages 258 generated by related client devices 108*b* with the browsing client device 108*a*.

As illustrated in FIG. 6A, the garage listing display 264 displays a garage list 266 of individual garages 258 (which includes garage name, a brief description, and product count 256 in each garage) in order of the most recently added by default. Browsing client device 108*a* has the option of changing the sort order to display garages 258 alphabetically (by garage name) or sorting by other means. Browsing client device 108*a* may also filter garages 258 shown by a specific owner, the account of which has been relationally linked to the account of the browsing client device 108*a*. As detailed below, selecting any garage 258 (as illustrated by arrow 526 for example, selecting garage titled BOOKS from garage list 266) will display details about the selected garage BOOKS, including products associated therewith (best shown in FIG. 6B).

Figure 6B:
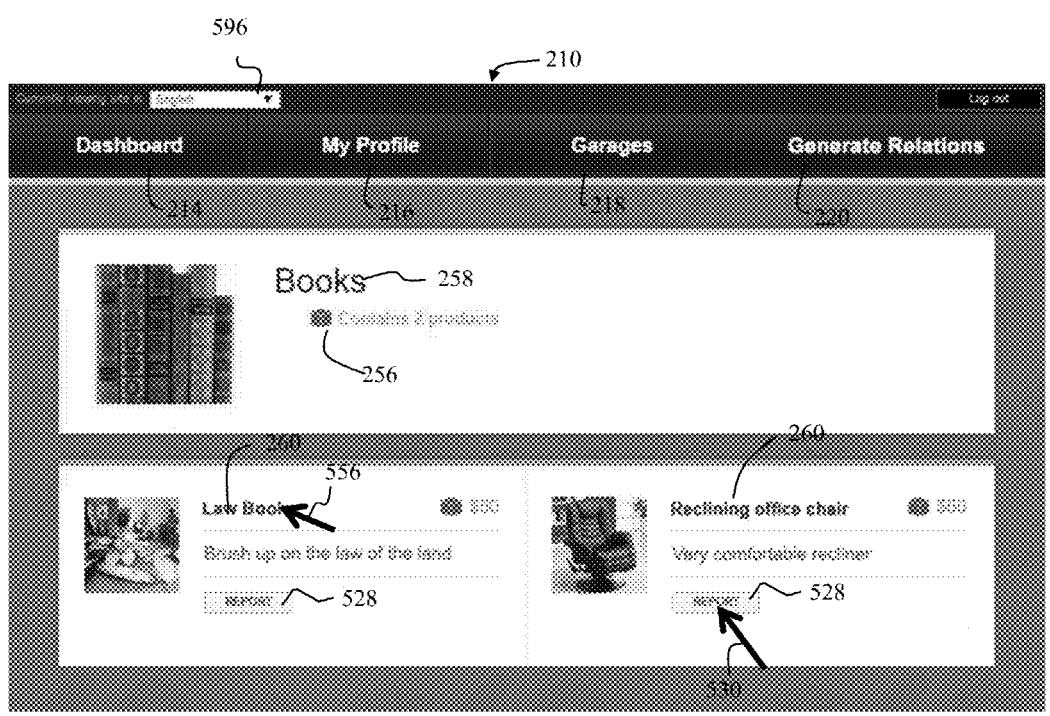
FIG. 6B is a non-limiting, exemplary GUI illustration of a single garage of a related client device displayed by browser of a browsing client device in accordance with one or more embodiment of the present invention.

FIG. 6B is a non-limiting, exemplary illustration of a selected garage to view associated products 260 that are on sales in accordance with an embodiment of the present invention. As further detailed below, browsing client device 108*a* may select as shown by arrow 556 any specific product such as Law Books, etc. to view details of that product (shown in FIGS. 11A-1 and 11A-2, detailed below). The single garage view shown in FIG. 6B also provides browsing client device 108*a* the ability to report products for a variety of different reasons using "Report" GUI icon 528.

Figure 6C:
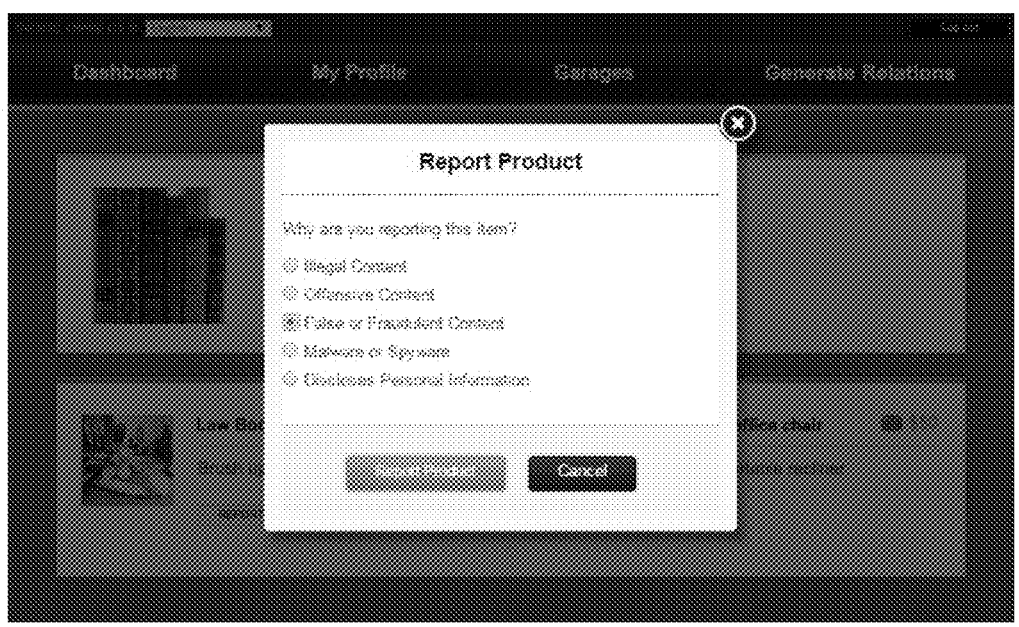
FIGS. 6C and 6D are a non-limiting, exemplary GUI illustration that display report product in accordance with one or more embodiment of the present invention.
Figure 6D:
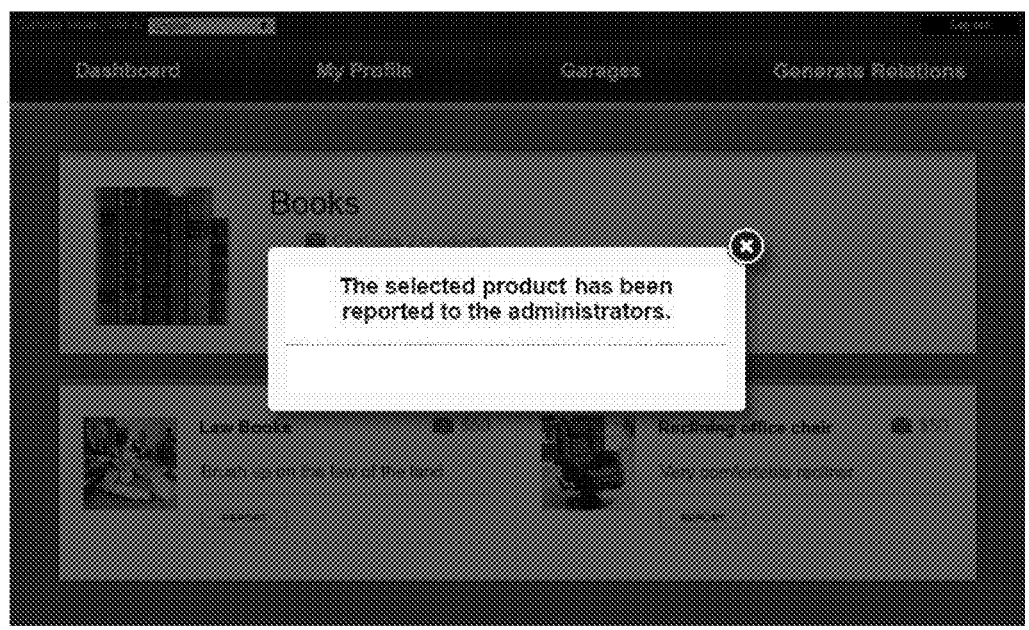

Selection of Report GUI icon 528 (as illustrated by arrow 530) transmits a request for reporting a product to network-based social-marketplace platform 102, which in turn, transmits a GUI dialog box illustrated in FIG. 6C to browsing client device 108*a*. This allows browsing client device 108*a* to select a reason for reporting the product. Selection of a reason and "Report Product" GUI icons enables browsing client device 108*a* to transmit the report to network-based social-marketplace platform 102, which in turn, transmits e-mail to the administrators. Once e-mail has been transmitted, browsing client device 108*a* is transmitted with a success message illustrated in FIG. 6D. Thereafter, it is up to administer to decide if the reported product needs to be removed from database.

FIG. 7A to 7D are a non-limiting, exemplary illustration of GUIs for generating relations in accordance with an embodiment of the present invention. As further detailed below, generate relations GUI icon 220 in the embodiment illustrated in FIGS. 7A to 7D within main navigational menu bar 210 enables browsing client device 108a to request and "invite" networked client devices 108c related to the browsing client device 108a on other, external networks (such as network-based social-media platform 202) via API 116. The request would enable selected networked client devices 108c to access and be networked with browsing client device 108a on the network-based social-marketplace platform 102 and hence, become related client devices 108b to browsing client device 108a.

Selection of generate relations GUI icon 220 will cause network-based social-marketplace platform 102 to retrieve a networked accounts listing 268 of networked use accounts 500 of networked client devices 108c that are networked with the browsing client device 108a on an associated external platform (e.g., network-based social-media platform 202 as shown in FIG. 1C). Networked accounts listing 268 allows browsing client device 108a to select specific networked user accounts 500 of networked client devices 108c from network-based social-media platform 202 to be invited to the network-based social-marketplace platform 102 (FIG. 7A) and become related client devices 108b to the browsing client device 108a. It should be noted that networked account listing 268 may be generated by API 114 of network-based social-media platform 202.

Done requests GUI icon 270 is selected after the networked user accounts 500 associated with desired networked client devices 108c are selected. Selection of Done GUI icon 270 would result in forwarding an invitation message 272 (FIG. 7B) to the accounts of the selected networked client devices 108c. The invitation message 272 invites the selected networked user accounts 500 of networked client device 108c to access network-based social-marketplace platform 102 and provides an invitation link embedded within the message 272 so that the selected networked client devices 108c, upon receiving this message, can easily access network-based social-marketplace platform 102.

Figure 7A:
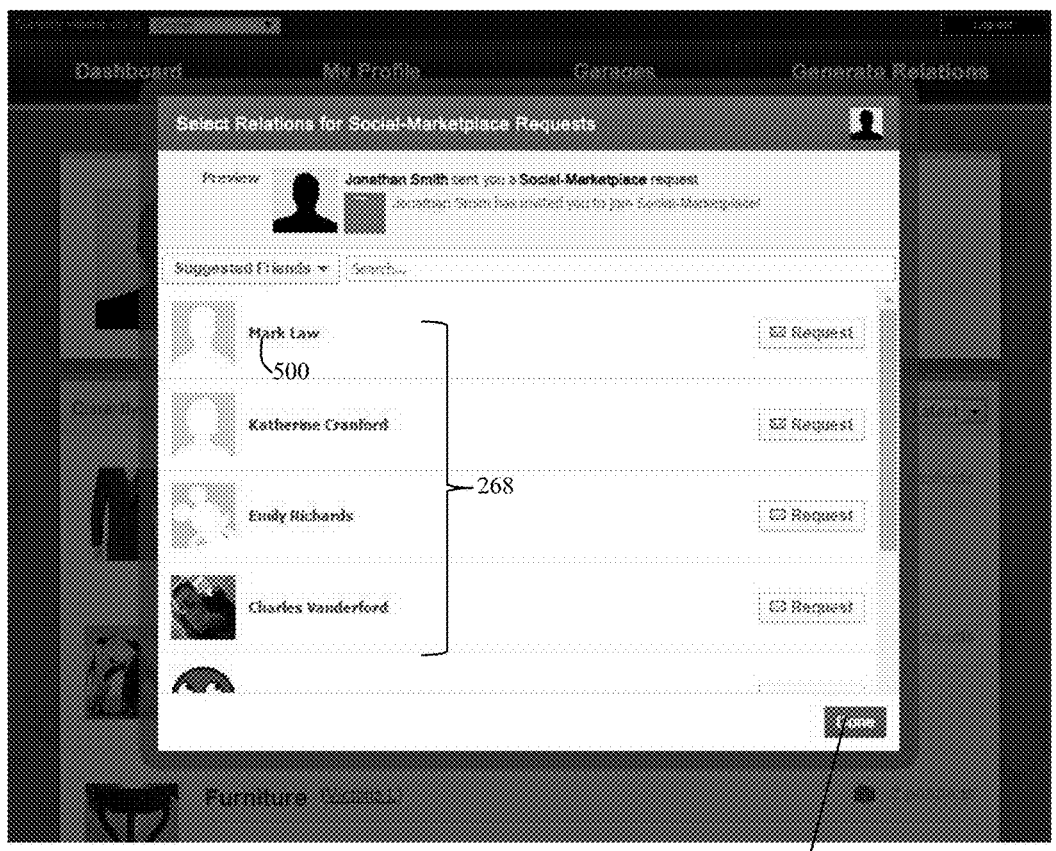
FIG. 7A to 7D are non-limiting, exemplary illustrations for generating relations in accordance with one or more embodiment of the present invention.
Figure 7B:
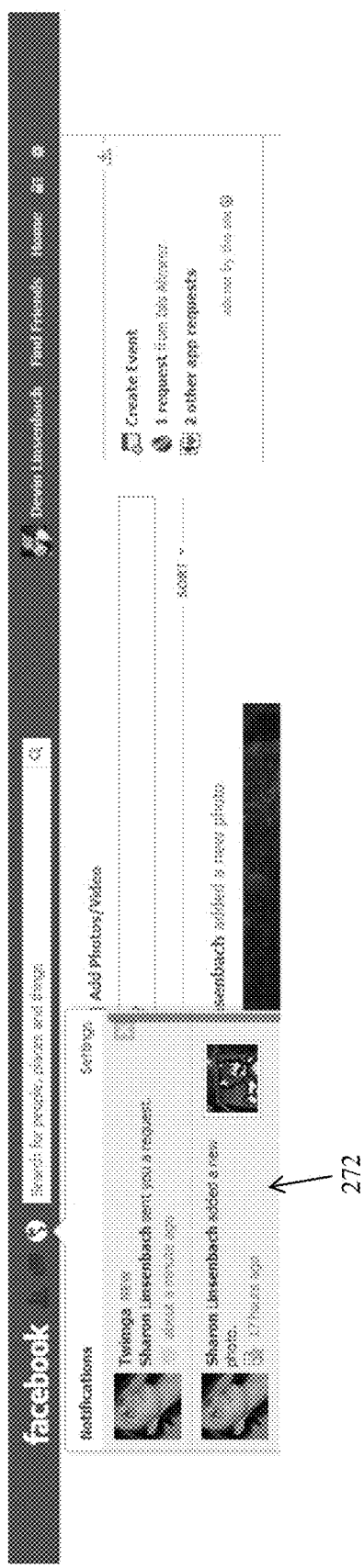
Figure 7C:
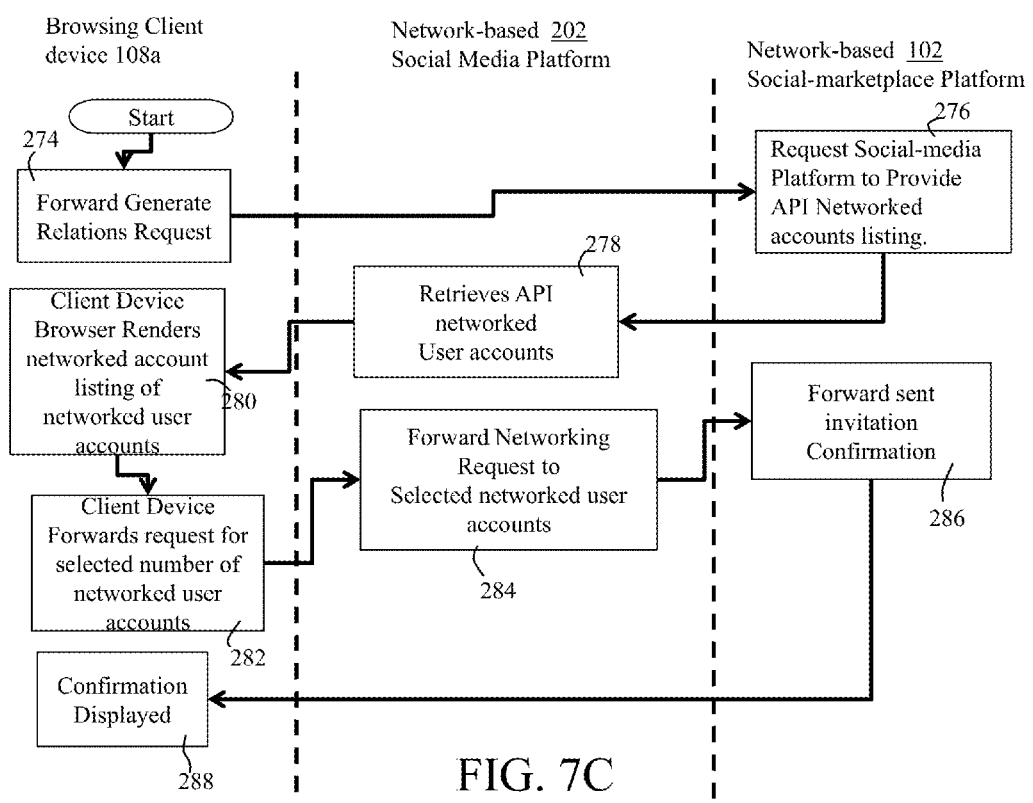

As more specifically illustrated in FIG. 7C for the particular embodiment being discussed, browsing client device 108a through a browser forwards a generate relations request (for example, using a GUI icon such as a "generate relations" 220) at operation 274 to the network-based social-marketplace platform 102. Generate relations request 274 allows browsing client device 108a to establish its related client devices 108b on the network-based social-marketplace platform 102. That is, request 274 allow browsing client device 108a to network with other networked client devices 108c that have a preexisting relationship with browsing client device 108a on some external, network-based social media platform 202. It should be noted that as indicated above, the browsing client device 108a is already a member of (or registered with) network-based social-media platform 202 in accordance with one or more embodiments and therefore, browsing client device 108a already has networked client devices 108c on the social media platform 202.

The network based social-marketplace platform 102 receives generate relations request 274 from the browsing client device 108a and forwards the request 274 to the network-based social media platform 202 at operation 276 for generating a client relations information 382 of browsing client devices 108a. Request 274 includes client profile information 364 of browsing client device 108a, which has the user profile information of network-based social-media platform 202. As indicated in relation to FIGS. 2A and 2B, user profile information was originally provided by network-based social-media platform 202 when logging onto the platform 102.

Network-based social-media platform 202 receives generate relations request 274 from network-based social-marketplace platform 102 and retrieves and generates networked user accounts of user profile of browsing client device 108a at operation 278. The networked user accounts generated at operation 278 may include established relationships based on user profile of browsing client device 108a on network-based social media platform 202 (e.g., list of networked social-media user identifications).

Networked users accounts 500 is transmitted to browsing client device 108a by network-based the social-media platform 202 at operation 278, and is received and rendered by browsing client device 108a and displayed as a GUI dialog (FIG. 7A) at operation 280. As indicated in relations to FIG. 7A, the display includes networked accounts listing 268 of the networked user accounts 500 of networked client devices 108c with pre-existing relationships based on user profile of browsing client device 108a on the network-based social-media platform 202.

Browsing client device 108a forwards selected networked user accounts 500 (for example, using a GUI icon such as a "Request" shown in FIG. 7A) at operation 282 to enable the selected, networked user accounts 500 to be associated and network with browsing client device 108a on network-based social-marketplace platform 102, with the request received by the network-based social media platform 202. The network-based social media platform 202 forwards generate relations request to the selected networked user accounts 500 of networked client devices 108c at operation 284 for association with network-based social-marketplace platform 102 and networking with browsing client device 108a. As indicated above, request 274 includes a link that when selected by the selected networked client device 108c, directs the selected networked client device 108c to the network-based social-marketplace platform 102.

Network-based social-media platform 202 further forwards a confirmation to the network-based social-marketplace platform 102 at operation 284 that the requests 274 were appropriately sent. Network-based social-marketplace platform 102, in turn, communicates the confirmation to browsing client device 108a at operation 286, where it is rendered by and displayed by the browsing client device 108a at operation 288.

Figure 7D:
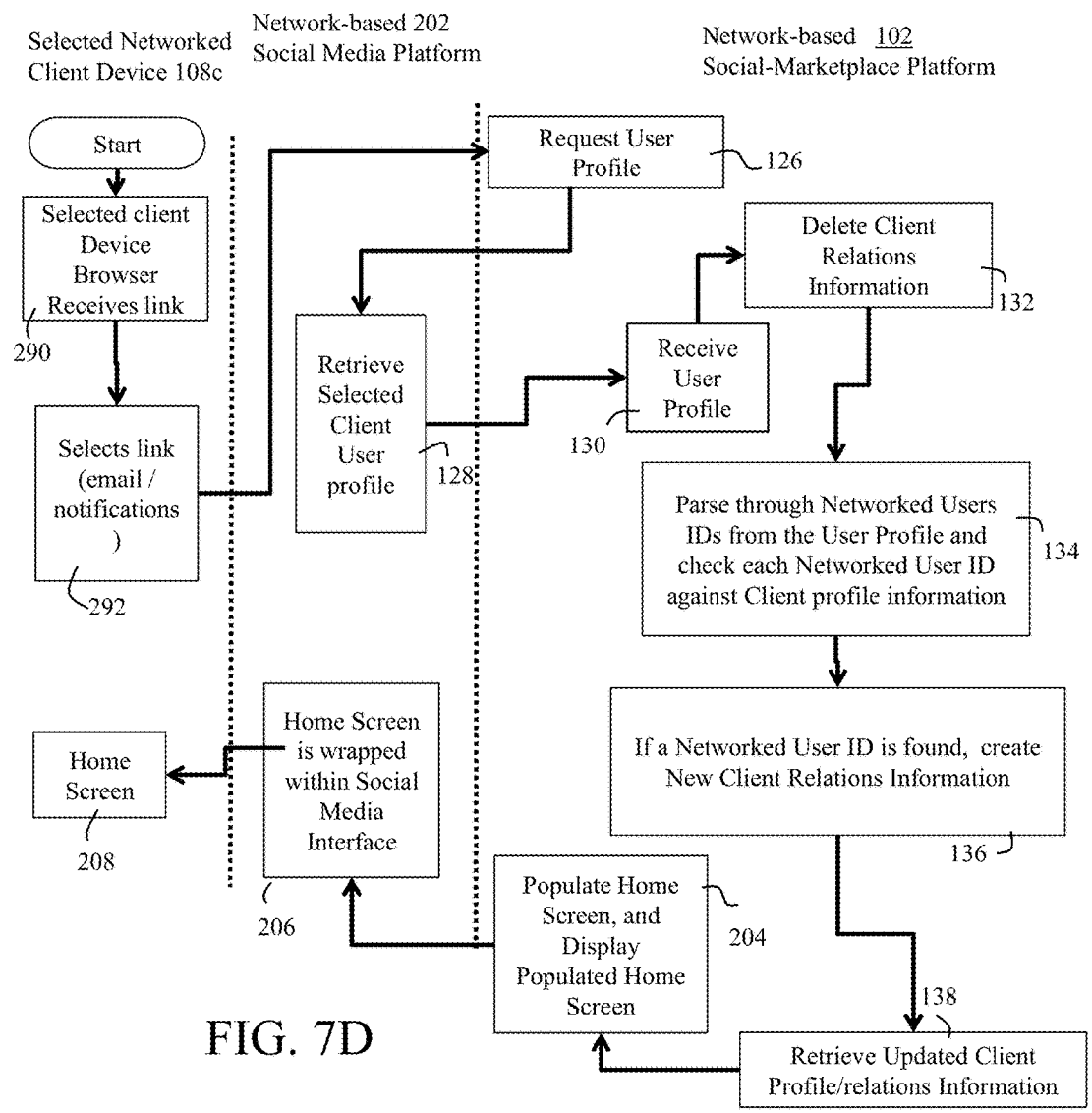

As illustrated in FIG. 7D, at operation 290, a selected networked client device 108c receives request 274 for association with network-based social-marketplace platform 102, with request 274 including invitation link to network-based social-marketplace platform 102. The invitation link may be received as notification or as an email associated with the network-based social media platform 202 in well-known manner.

Selected networked client device 108c (via browser) confirms the request for association with network-based social-marketplace platform 102 by selection of invitation link at operation 292, which confirmation is transmitted to the network-based social-marketplace platform 102. Network-based social-marketplace platform 102 receives the request and transmits a request to retrieve selected user account information (user profile) from the network-based social-media platform 202 at operation 126, with the remaining process similar to those described in FIGS. 2A and 2B. It should be noted that it is assumed that when invitation link is selected, networked client device 108c is logged onto the network-based social media platform 202 otherwise, networked client device 108*c* may be prompted to log onto network-based social media platform 202. At his stage, a networked client device 108*c* becomes a related client device 108*b* to browsing client device 108*a* that made the generate relations request.

Figure 8A:
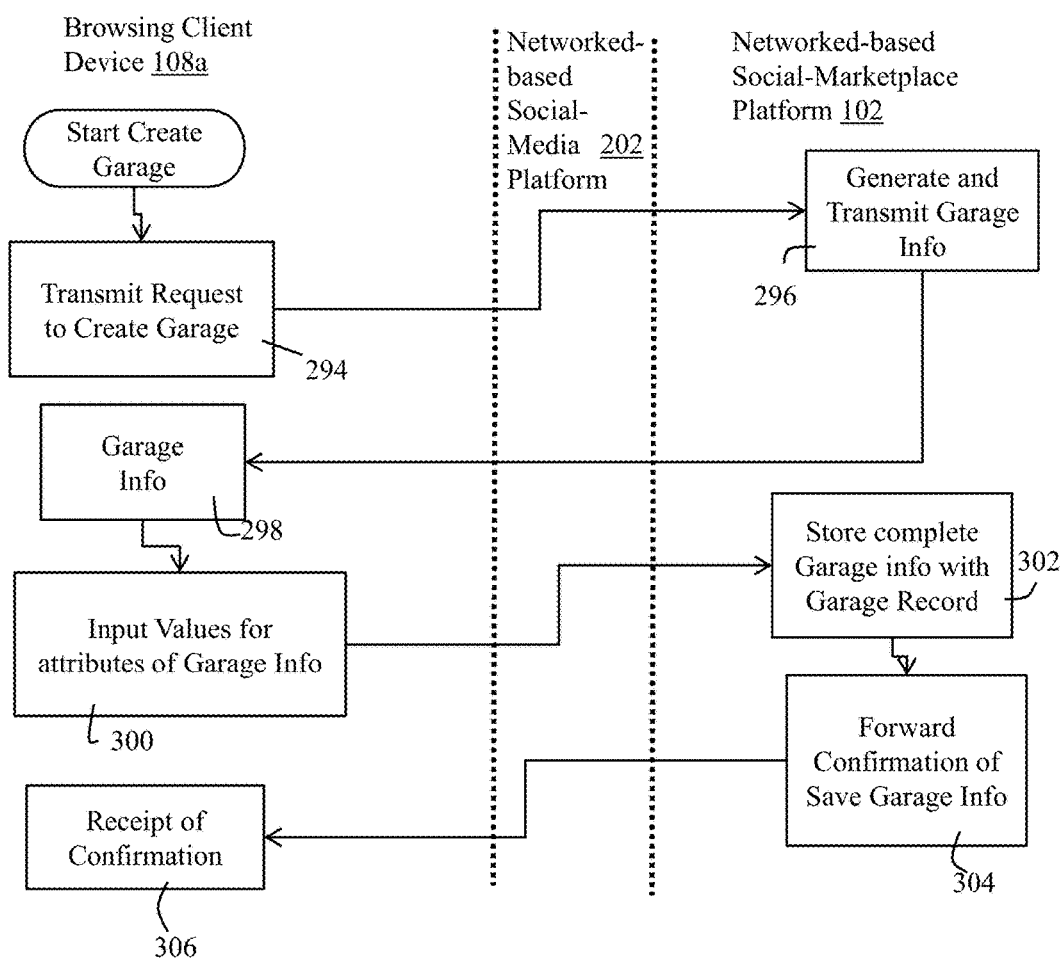
FIG. 8A to 8B-2 are non-limiting, exemplary illustrations for generating garages in accordance with one or more embodiment of the present invention.
Figures 1, 8B:
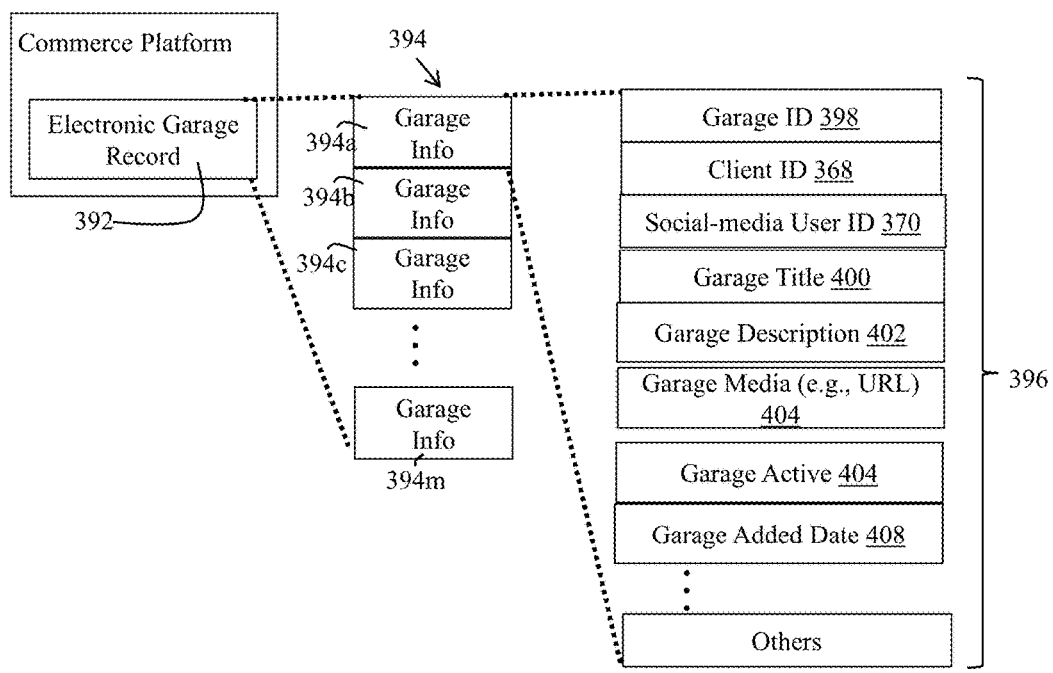
Figures 2, 8B:
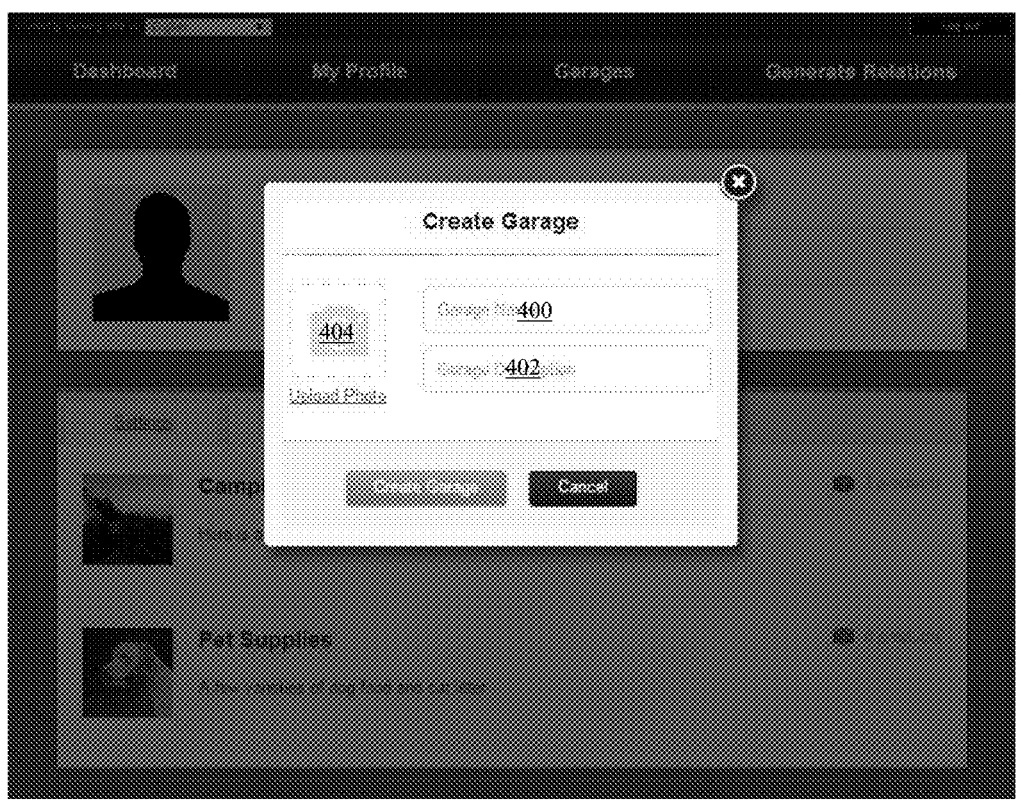

FIGS. 8A to 8B-2 are non-limiting, exemplary illustrations of operations for creating a garage for a garage or yard sales in accordance with one or more embodiments of the present invention. As illustrated in FIG. 8A, at operation 294 browsing client device 108*a* may generate a garage 258 by transmitting a request to networked-based social-marketplace platform 102, which may be accomplished by selection of new garage link represented by GUI icon 230 (e.g., shown in FIG. 4). Creating a virtual "garage" for garage or yard sales is similar to creating a category or virtual "storefront" that facilitate organized grouping of products for transactions. Accordingly, a "garage" may be considered as a category for grouping of products for transaction.

Selection of New Garage link GUI icon 230 transmits a request for creation of new garage 258 to networked-based social-marketplace platform 102. At operation 296, networked-based social-marketplace platform 102 receives the request and returns a garage information 394 of an electronic garage record 392 (FIG. 8B-1) as a GUI dialog box to the browsing client device 108*a*, indicated at operation 298. The garage information 394 of garage record 392 at operation 298 enables creation of new garage 258. FIG. 8B-1 is an exemplary chart that represents the electronic garage record 392, and FIG. 8B-2 is a non-limiting, exemplary GUI representation that allows a browing user via browsing client device 108*a* to provide some of the information need for generating garage info 394 of garage record 392.

As illustrated in FIGS. 8B-1, electronic garage record 392 is a record of garages that have been created. Garage electronic record 392 may include a number of related items of information about a garage 258. Accordingly, garage record 392 may include one or more garage information 394, with each garage information 394 having attributes 396 the values of which define garage information 394 of garage record 392. Non-limiting, non-exhaustive listing of attributes 396 for garage information 394 may include:

Garage ID 398, which is a globally unique identifier of a garage

Client ID—368 is used to associated the identified garage with the client ID (or account associated with client ID)

Social-media User ID 370—the use of this identifier within the context of garage electronic record 392 may be optional in that this attribute performs the same function as client ID 368 within the context of garage electronic record 392. Further and as indicated above, if network-based social-marketplace 102 is not associated with network-based social-media platform 202 (as detailed in relation to FIGS. 13 and 14), social-media user ID 370 will not be required.

Garage title 400

Garage description 402

Media attribute 404

Garage active 406, which enables publishing of the garage content to be viewed by related client devices 108*b*

Garage add date 408, which is the date the particular garage with Garage ID 398 was added.

As best illustrated in FIG. 8B-2, some of the attributes 396 of chart shown in FIG. 8B-1 may be set by "Create Garage" dialog box GUI. Non-limiting examples of attributes 396 that may actually be displayed in the GUI for garage information 394 illustrated in FIG. 8B-1 may include, for example, title or name attribute 400 for simply naming garage 258, a brief description attribute 402 of garage 258, a media (e.g., a picture) attribute 404 associated with garage 258 to provide a media representation of garage 258, and so on. Memory/storage module 162 of browsing client device 108*a* may be accessed in well-known conventional manner for data to define or set value of an attribute. For example, media attribute 404 for the garage 258 represented by GUI icon 404 when selected, may commence well known and conventional processes for uploading a picture or other media from memory/storage module 162 of browsing client device 108*a*.

Referring back to FIG. 8A, browsing client device 108*a* may transmit garage info 394 with set values for attributes 396 to network-based social-marketplace platform 102 at operation 300, with garage info 394 and values of the attributes 396 thereof saved within database 118 of network-based social-marketplace platform 102 at operation 302. A confirmation of the saved garage record 392 is transmitted to the browsing client device 108*a* at operation 304, and displayed by browsing client device 108*a* at operation 306. The saved garage info 394 within garage record 392 includes one or more attributes 396 and respective values thereof that associate the garage info 394 with the client record 396 of user of browsing client device 108*a*. It should be noted that created garage 258 may be accessed by selecting My Profile GUI icon 216 and then Garage folder tab 494 (best illustrated in FIG. 5C). Once a garage 258 is created, network-based social-marketplace platform 102 updates garage listings 248 with the newly created garage 258. As further illustrated in FIG. 5C, the browsing client device 108*a* is also provided with various navigational GUI icons to enable addition of products to the garage 258 for transactions. Once garage info 394 has been stored in network-based social-marketplace platform database 118, garage 258 becomes accessible as a place for browsing client device 108*a* to add and transact products.

Figure 9A:
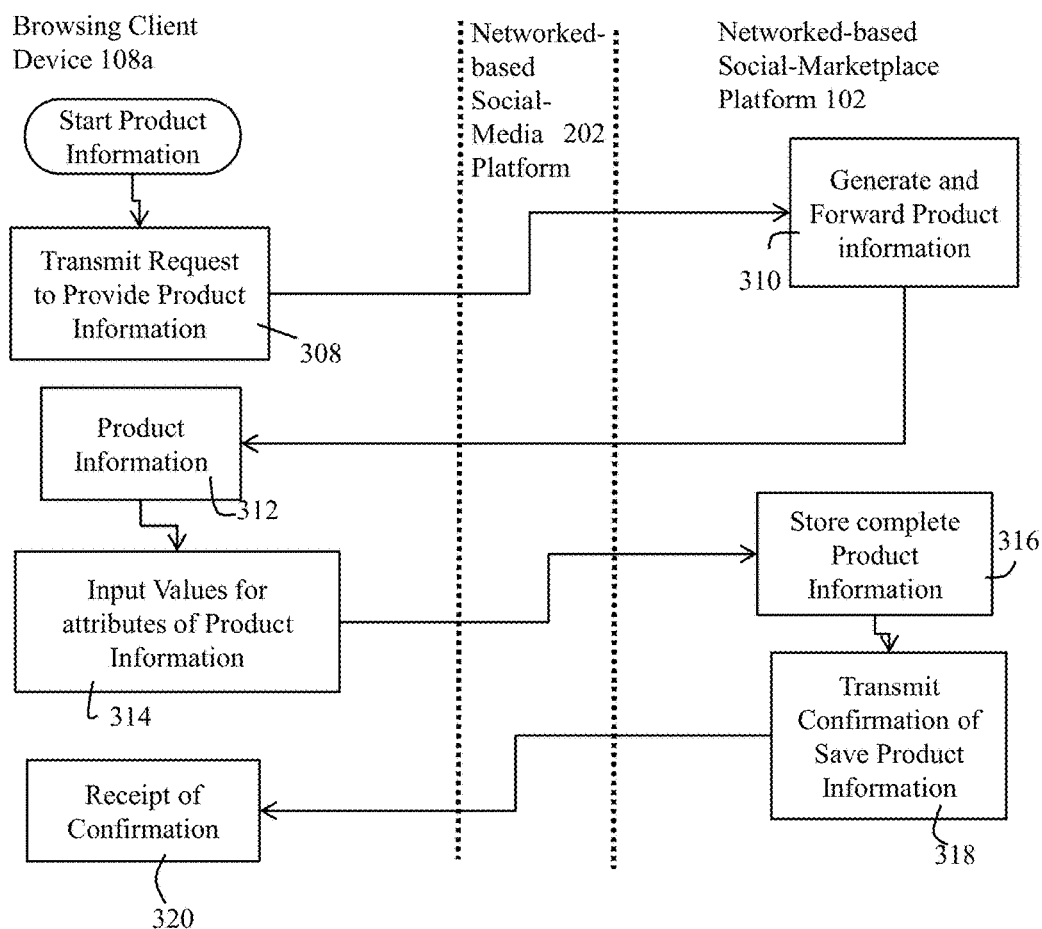
FIG. 9A to 9C are non-limiting, exemplary illustrations for generating products in accordance with one or more embodiment of the present invention.
Figures 1, 9B:
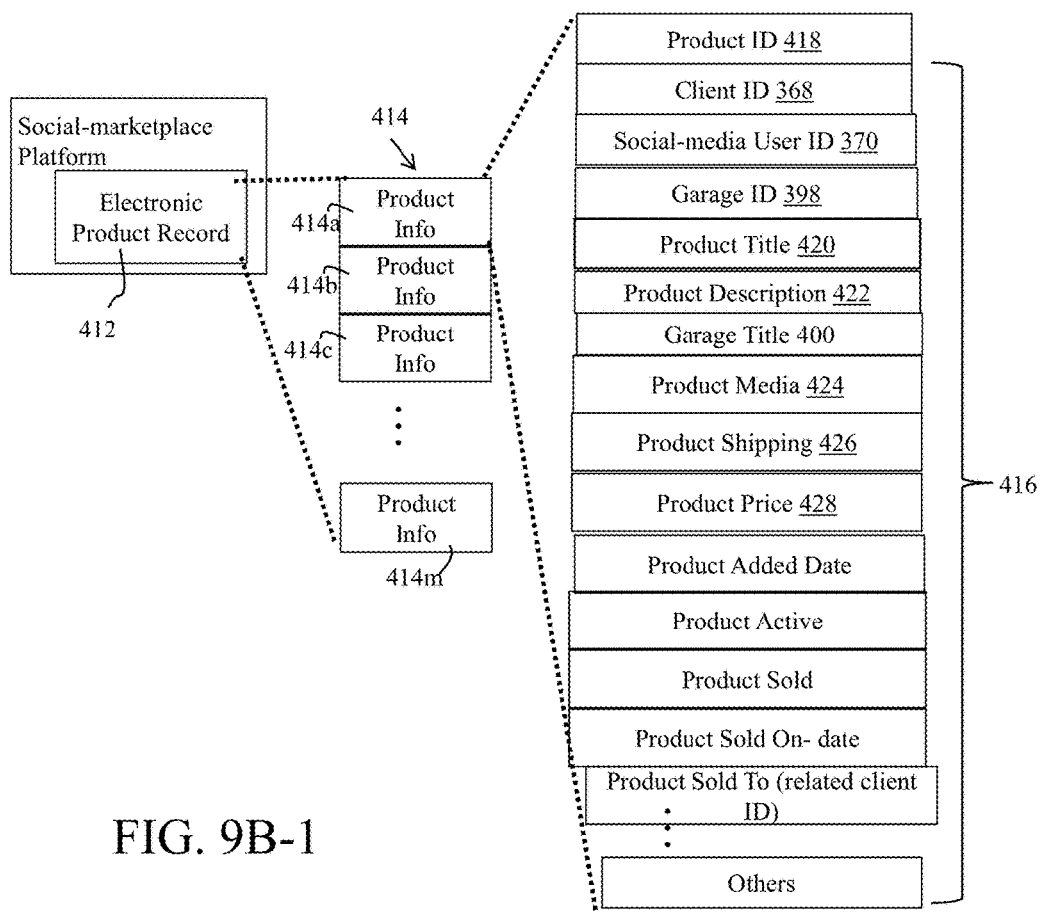
Figures 2, 9B:
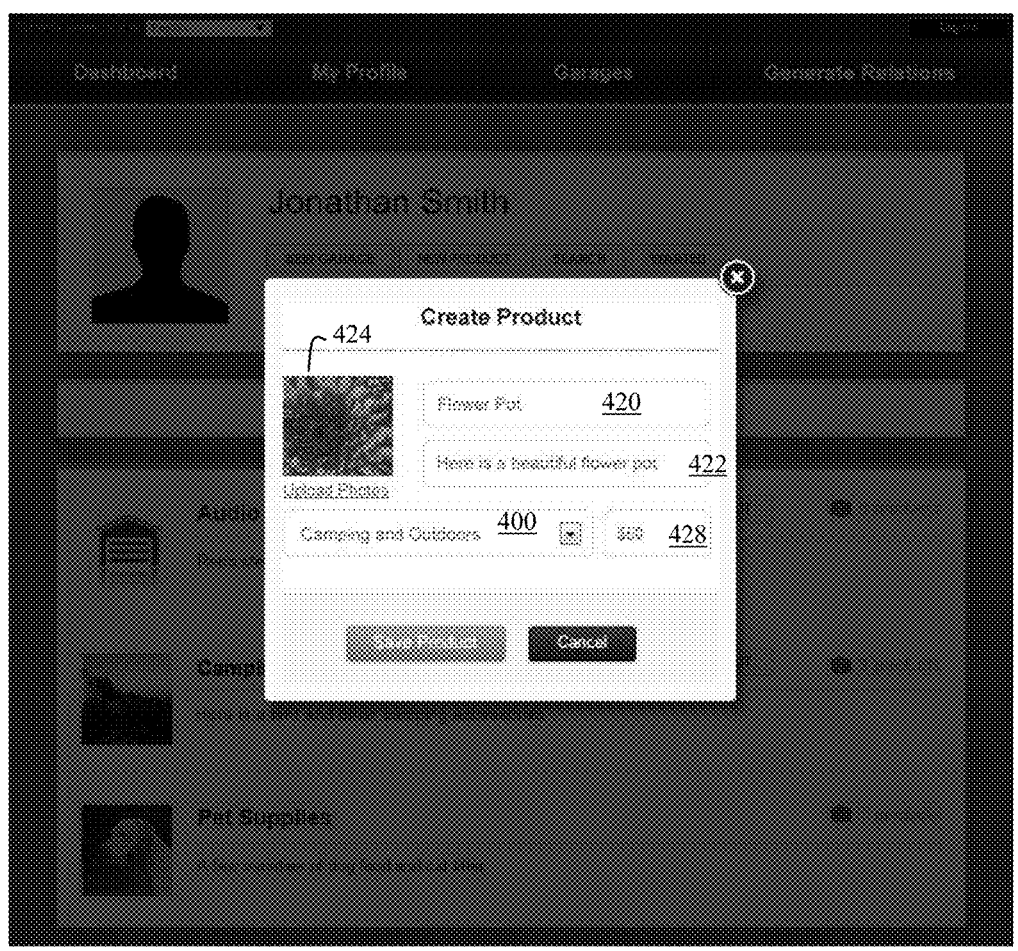
Figures 3, 9B:
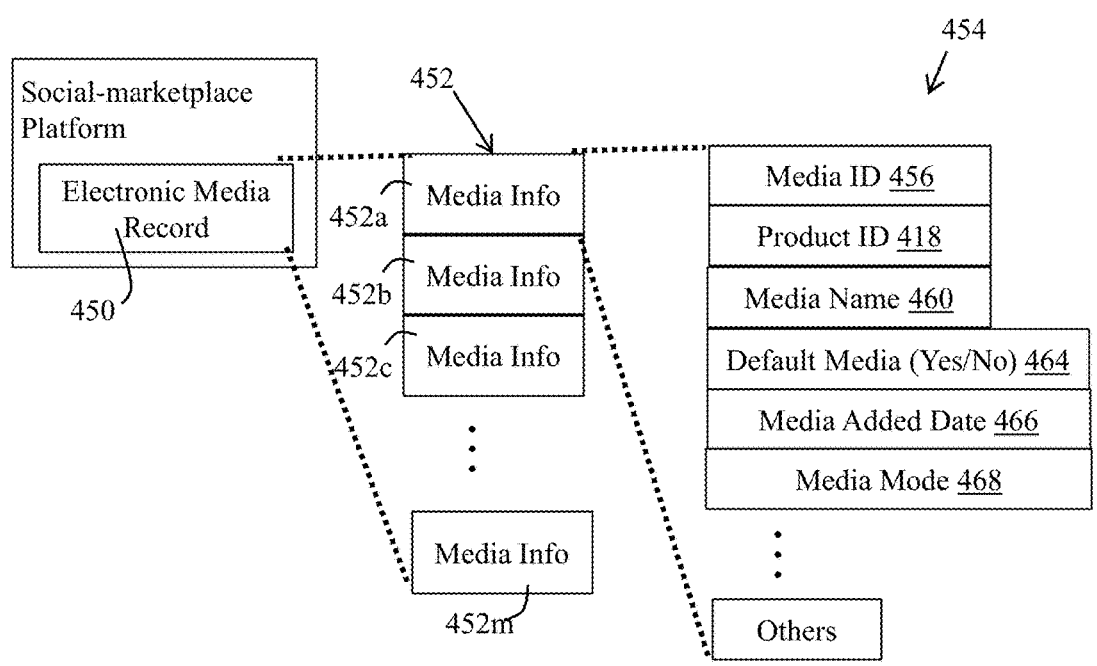
Figure 9C:
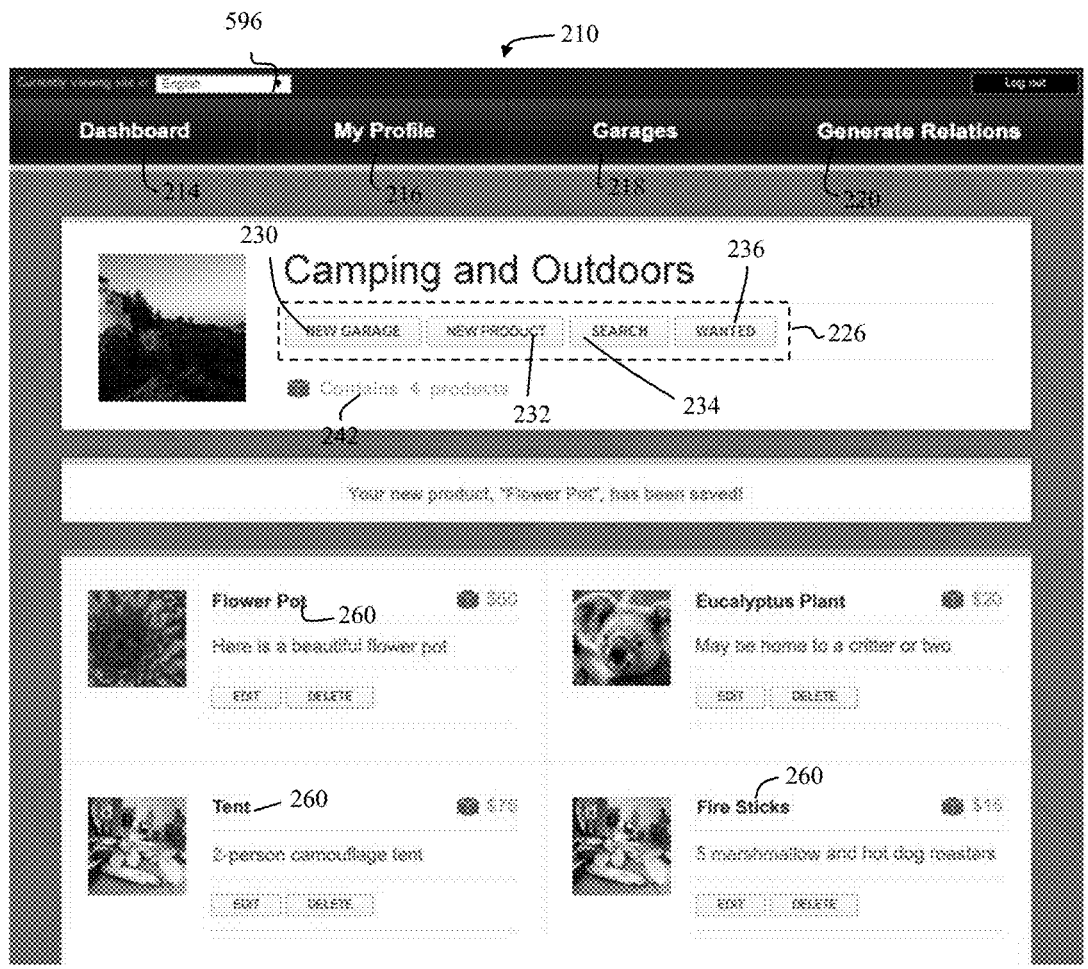

FIGS. 9A to 9C are non-limiting, exemplary illustrations of operations related to generating products for a garage in accordance with one or more embodiments of the present invention. Once garages 258 are generated, information about products 260 to be transacted may be added to one or more garage 258 for transaction.

As illustrated in FIG. 9A, to provide or generate information about a product 260, browsing client device 108*a* (via a browser) transmits a product information request at operation 308 (for example, by selecting "Add Product" or "New Product" GUI icons 232 or 254 best shown in FIG. 5C) to network-based social-marketplace platform 102. This will commence the process for adding information about a product to existing garage 258. It should be noted that a garage must first be created before information about a product may be added and associated with one or more garages.

Network based social-marketplace platform 102 receives the add product request, and at operation 310 returns a product information 414 (FIG. 9B-1) to browsing client device 108*a* in a form of a GUI dialog box (best shown in FIG. 9B-2) at operation 312 to enable adding information about a product.

As illustrated in FIGS. 9B-1, an electronic product record 412 is a record of products that have been created. Accordingly, electronic product record 412 may include one or more product information 414, with each product information 414 having attributes 416 the values of which define product information 414 of product record 412. Non-limiting, non-exhaustive listing of attributes 416 for product information 414 may include:

- Product ID 418, which is a globally unique identifier of a product
- Client ID —368 is used to associated the identified product with the client ID, which is part of client electronic record 362
- Social-media User ID 370—the use of this identifier within the context of product electronic record 412 may be optional in that this attribute performs the same function as client ID 368 within the context of the product electronic record 412. Further, if network-based social-marketplace 102 is not associated with network-based social-media platform 202 (as detailed in relation to FIGS. 13 and 14), social-media user ID 370 will not be required.
- Garage ID 398 (associates the product with a specific garage)
- Garage Title 400
- Product Title 420
- Product description 422
- Media attribute for product 424
- Product price 428
- Product add date and so on.

Some of attributes 416 of product info 414 shown in FIG. 9B-1 may be set using "Create Product" dialog box GUI best illustrated in FIG. 9B-2. Non-limiting examples of attributes 416 that may be actually displayed in the GUI of FIG. 9B-2 for product information 414 chart illustrated in FIG. 9B-1 may include, for example, title or name attribute 420 for simply naming the product, a brief description attribute 422 of the product, a media (e.g., a picture) attribute 424 associated with the product to provide one or more media representations of product, garage 258 to be associated with the product (via garage ID 398), product price attribute 428, and so on. It should be noted that each product may have multiple images assigned to it. Operations for managing media for a product (e.g., addition by uploading, deletion, setting default media, etc.) are done in well-known conventional manner. As with other electronic records, memory/storage module 162 of browsing client device 108*a* may be accessed in well-known conventional manner for data to define or set value of an attribute. For example, the product media attribute 424 for the product represented by GUI icon 424 when selected, may commence well known and conventional processes for uploading a media (e.g., picture/video) from memory/storage module 162 of browsing client device 108*a*.

Once images have been successfully managed for the product, they may be saved as a collection with identifiers, which enable network-based social-marketplace platform 102 to finalize the process of matching collection of media to the product being added in well-known manner (for example, using SQL). Network based social-marketplace platform 102 receives product information 414 as a data post and reads the data (values of the attributes) that is being sent to it in order to create a record in the product record 412, and also creating one record in an electronic media record 450 per each image that the browsing user has added to the product. Upon completion of this process, the product becomes visible to any related client devices 108*b*.

As illustrated in FIGS. 9B-3, the electronic media record 450 is a record of various media associated with a product that has been created. Accordingly, media record 450 may include one or more media information 452 related to one or more media files, with each media information 452 having attributes 454 the values of which define the media record 452. Non-limiting, non-exhaustive listing of attributes 454 for media information 452 may include:

- Media ID 456, a globally unique identifier of particular media (e.g., a specific picture file, or a video file).
- Product ID 418
- Media name —460
- Media status (e.g., as Default) 464
- Media added date 466
- Media type 468 (e.g., image, video, etc.)

It should be noted that any type of media may be stored and therefore, media is not just limited to images or videos (for example, audio may be stored also).

More specifically, referring back to FIG. 9A, browsing client device 108*a* sets the values of the attributes 416 of the product information 414 at operation 314. Thereafter, product information 414 with set values for attributes 416 is transmitted to the network-based social-marketplace platform 102 at operation 314 when "save product" GUI (FIG. 9B-1) is selected, with the product information 414 and values of the attributes 416 thereof saved within database 118 of network-based social-marketplace platform 102 at operation 316. The saved product information 414 includes one or more attributes 416 and respective values thereof that associate product information 414 with at least one garage and client profile of a client account. A confirmation of the saved product information 414 is transmitted to the browsing client device 108*a* at operation 318, and displayed by browsing client device 108*a* at operation 320.

FIG. 9C is a non-limiting, exemplary illustration of a GUI for a single garage display of a browsing client device 108*a*, with populated products in accordance with one or more embodiments of the present invention. It should be noted that FIG. 5C is a display that illustrates all garages of a browsing client device 108*a*, accessed through selection of my profile GUI icon 216. FIG. 6B is a display of a single garage of a related client device 108*b* being viewed by browsing client device 108*a* whereas FIG. 9C is a display of a single garage of browsing client device 108*a*. In this non-limiting exemplary instance shown in FIG. 9C, browsing client device 108*a* may have selected "Camping and Outdoors" garage. As illustrated in FIG. 5C, the same garage had three products 260 under the specific product count 242 for "Camping and Outdoors" garage. However, as illustrated in FIG. 9C, after adding a new product 260 as described above in relation to FIGS. 9A to 9B-3, "Camping and Outdoors" garage has 4 products shown and indicated in the product count 242, with the newly added product being "Flower Pot." As further detailed below, selection of any product 260 will display further details about that product in accordance with information within product record 412.

Figure 10A:
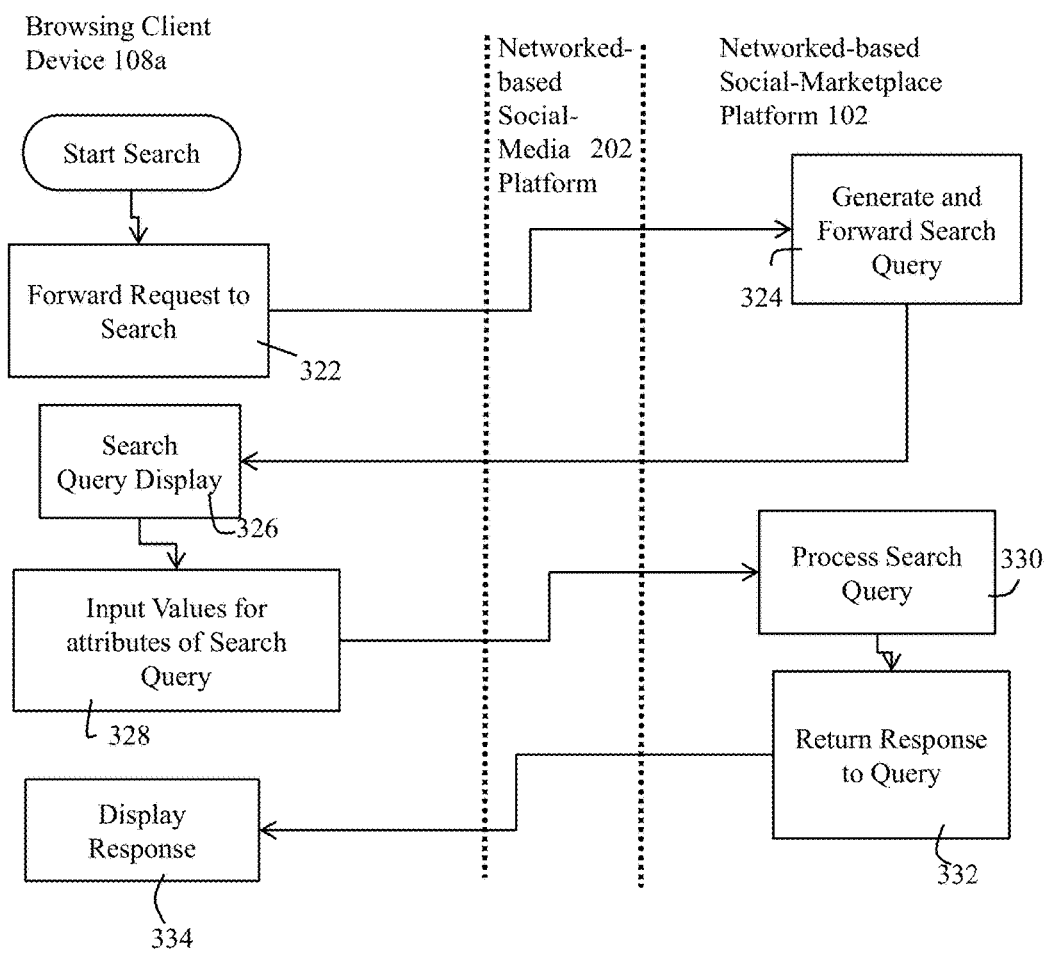
FIG. 10A to 10C are non-limiting, exemplary illustrations for search functionality in accordance with one or more embodiment of the present invention.
Figure 10B:
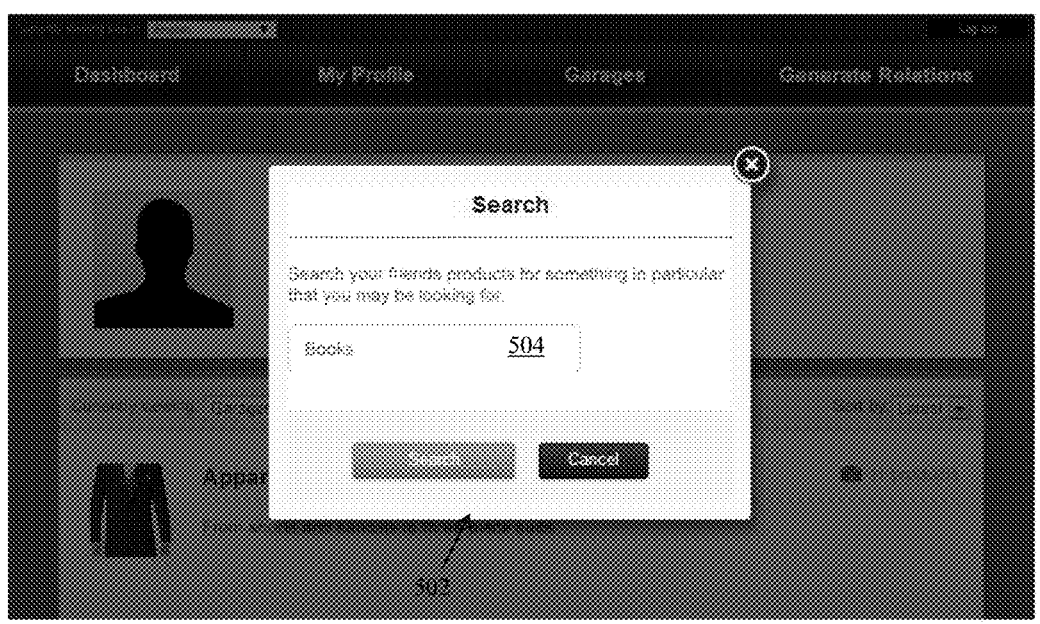
Figure 10C:
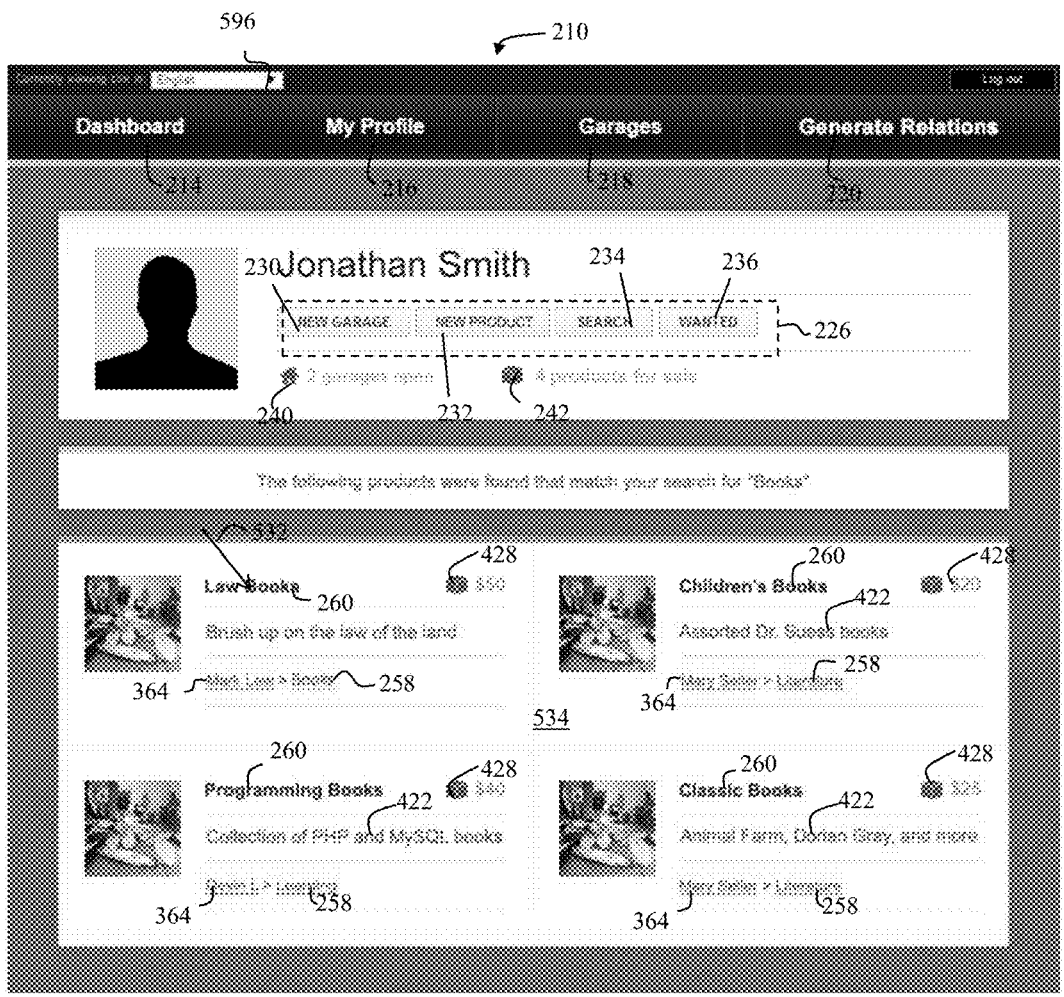

Since searching for products is a large part of network-based social-marketplace platform 102, a search tool is available to ease this process and return products matching searched queries to browsing client device 108*a*. FIGS. 10A to 10C are non-limiting, exemplary illustrations of operations for search in accordance with one or more embodiments of the present invention.

As illustrated in FIG. 10A, to search, browsing client device 108*a* may transmit a Search request at operation 322 (for example, by selecting "Search" GUI icon 234) to network-based social-marketplace platform 102 to search for and view a desired product. It should be noted that a product may be found by selecting to search for the product or by other mechanisms such as going through garages of accounts associated with related client devices 108*b* (FIG. 6A) or newsfeed 228. Network based social-marketplace platform 102 receives the search request at operation 324 and returns a search query dialog box 502 (FIG. 10B) to browsing client device 108a at operation 326 to enable searching. Browsing client device 108a transmits search query dialog box 502 with set values for the attributes of the search to network-based social-marketplace platform 102 at operation 328, with the search query and values of the attributes processed within network-based social-marketplace platform 102 at operation 330 (e.g., using SQL). As illustrated in FIG. 10B, the search query dialog box 502 includes a text area 504 that may be used in well-known conventional manner for well known "text based searches" of products.

Network based social-marketplace platform 102 processes the search query at operation 330 by searching databases 118 (e.g., using SQL) and returns a response GUI 506 (FIG. 10C) to the search query. Response GUI 506 may include data provided as a list of products, garages, or any other searchable element that may be queried. Accordingly, responses 506 provided may include a list of queried elements and displayed as shown in FIG. 10C by browsing client device 108a. It should be noted that in the non-limiting, exemplary instance shown in FIG. 10C, the result of the search query is comprised of products 260 that are posted by related client devices 108b. That is, the searched product list (or listing of search products) includes the actual product 260, garage 258 associated with the product 260, and also client profile information 364 associated with an account of related client device 108b. As further illustrated in FIG. 10C, also included is a brief description 422 of the product 260 and price 428.

Referring back to FIG. 10A, at operation 330 the query is provided as post data to network-based social-marketplace platform 102, which in turn issues a query (e.g., SQL based) to the database 118. Any products in the database 118 that were created by accounts of related client devices 108b that have been deemed as related to browsing client device 108a account will be returned in a electronic record set to network-based social-marketplace platform application 112. Social-marketplace platform application 112 then parses this data and returns it to browsing client device 108a, formatted as the searched product list of products 260 (FIG. 10C). If there are no products that match browsing client device 108a search terms, a message is transmitted to browsing client device 108a from the network-based social-marketplace platform 102 alerting browsing device 108a that no such products were found in the network-based social-marketplace platform database 118 (that are associated with the related client devices 108b). In other words, the network-based social-marketplace platform databases 118 may include that product, but that product is associated with an account of a client device that is not related to the account of browsing client device 108a that is searching for that product.

Figures 1, 11A:
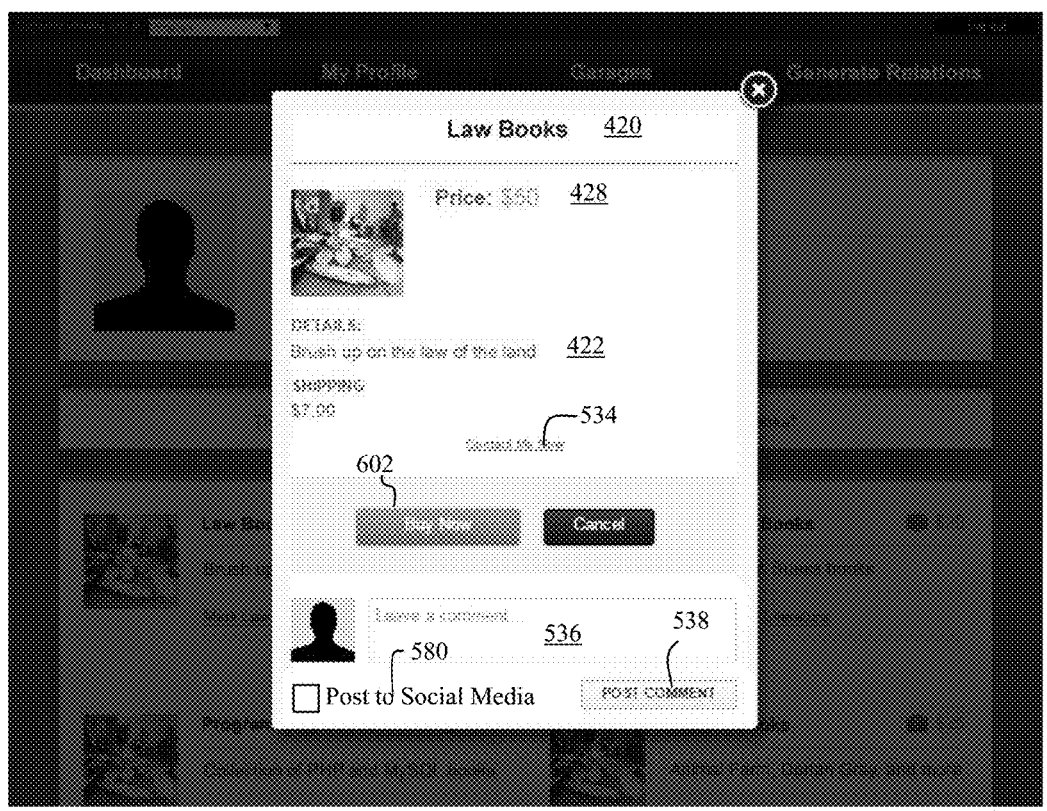
Figures 2, 11A:

FIGS. 11A-1 to 11A-2 are non-limiting, exemplary illustrations of a product detail dialog box GUI in accordance with an embodiment of the present invention. Product detail dialog box GUI 508 may be rendered by a browsing client device 108a as a result of a request to display details of a selected product to network-based social-marketplace platform 102. Network based social-marketplace platform 102 receives the request to display details of selected product and returns a product detail dialog box GUI 508 to browsing client device 108a, which is exemplarily illustrated in FIGS. 11A-1 and 11A-2, where the product may be purchased, or comments may be posted for the products, etc. As with most other GUI dialog boxes, displays, or various other GUIs illustrated, FIGS. 11A-1 and 11A-2 also provides content culled from different electronic records, which is rendered by browsing client devices 108a as the illustrated product detail dialog box GUI 508.

As illustrated in FIGS. 11A-1 and 11A-2, product detail dialog box GUI 508 may for example, include product title 420, prices 428, description 424, posted comments, a contact link 534 (e.g., an email address) of an account of a related client device 108b with which the product is associated, and so on. Product detail dialog box 508 also includes other features that enable a browsing client device to transmit data to commence process of transacting the product, including mechanism for browsing client device 108a to transmit and post comments related to the product to network-based social-marketplace platform 102.

When a desired product is found (for example, using the search function or searching through garages), the product's title 420 (e.g., Law Books in FIG. 6B or 10C) may be selected (as shown by arrow 556 in FIG. 6B or arrow 532 in FIG. 10C) to view the details associated with that product 260 (FIGS. 11A-1 and 11A-2). Selecting the product title 420 forwards a request for a product details dialog box GUI 508 from network-based social-marketplace platform 102, which includes information from various electronic records related to the product.

Figures 1, 11B:
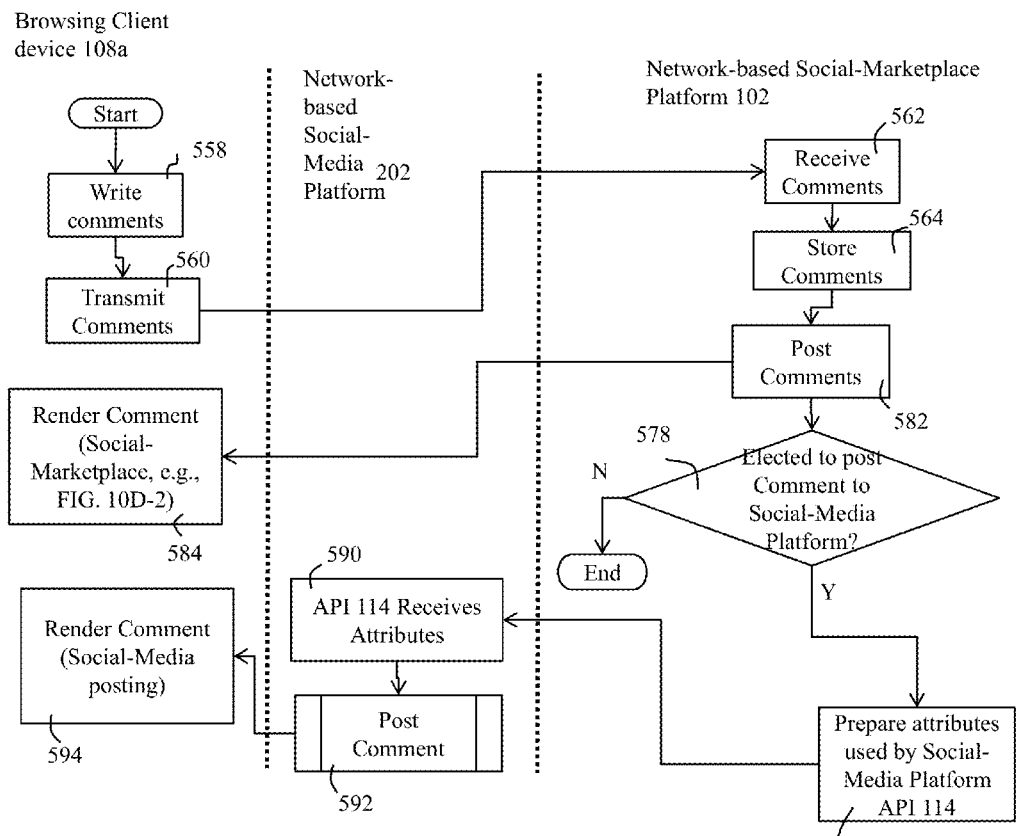
Figures 2, 11B:
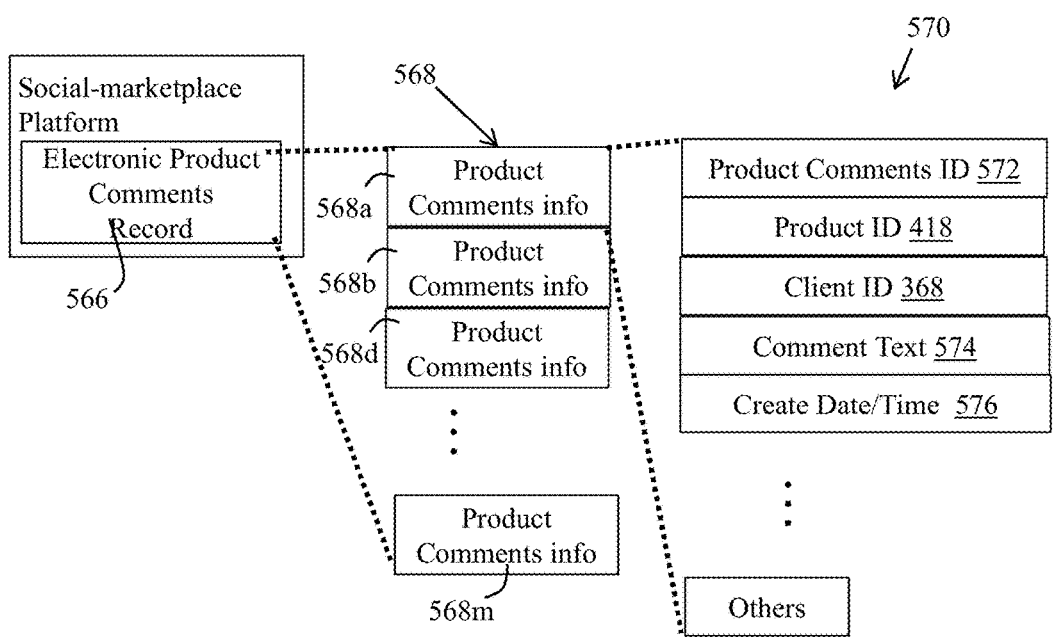

In addition to viewing the product details provided by the related client device 108b, the product detail dialog box GUI 508 also provides the ability to add comments for that particular products. FIG. 11B-1 is a non-limiting, exemplary flow diagram that illustrates the process of adding comments for products in accordance with an embodiment of the present invention. FIG. 11B-2 is a non-limiting, exemplary illustration of chart representing a product comments electronic record, which is generated by network-based social-marketplace platform 102 to track comments and associate them with products and accounts of client devices. As illustrated in FIG. 11A-1 to 11B-2, comments may be written within the comments text box 536 (FIGS. 11A-1 and 11A-2) at operation 558, and when done, may be transmitted to network-based social-marketplace platform 102 at operation 560 by selecting post comments GUI icon 538.

As further illustrated in FIG. 11B-1, transmitted comments from browsing client device 108a is received by network-based social-marketplace platform 102 at operation 562, and stored within an electronic product comments record 566 (FIG. 11B-2) at operation 564. Thereafter, the comments are posted at operation 582 and rendered by browsing client device 108a at operation 584 (best illustrated in FIG. 11A-2). As illustrated in FIG. 11B-2, electronic product comments record 566 is a record of comments associated with a product 260 that has been created. Accordingly, product comments record 566 may include one or more product comment information 568 related to comments made for a product 260, with each product comment information 568 having attributes 570 the values of which define the product comments record 566. Non-limiting, non-exhaustive listing of attributes 570 for product comment information 568 may include:

Product Comment ID 572, a globally unique identifier of particular comment for a specific product
    Product ID 418
    Client ID 368
    Comment Text 574
    Create Date/Time 576

It should be noted that in addition to pure text, other file types may also be added to the comments section such as emoticons, or other media.

Referring back to FIG. 11B-1, as part of the processing comments, network-based social-marketplace platform 102 further determines if instructions are provided to post comments to social-media platform 202 at operation 578 (in addition to the social-marketplace platform 102). Referring to FIGS. 11A-1 and 11A-2, if post to social media attribute illustrated as a GUI checkbox 580 in FIGS. 11A-1 and 11A-2 is selected by browsing client device 108a, at next operation 588 network-based social-marketplace platform 102 prepares attributes which are to be used by API 114 of network-based social-media platform 202 for posting the comments on social media platform 202 (further detailed below). If GUI checkbox 580 is not selected by browsing client device 108a, network-based social-marketplace platform 102 posts the comments at operation 582 regardless, which is displayed at the comments section and rendered by client device 108 as FIG. 11A-2. It should be noted that if network-based social-marketplace 102 is not associated with network-based social-media platform 202, post to social comments attribute and hence, GUI checkbox 580 will not be required.

As indicated above, comments may also be posted on networked-based social media platform 202 if desired to do so in addition to being posted within the comments area 536. As indicated above in relation to FIGS. 11A-1 and 11A-2, if post to social media attribute illustrated as a GUI checkbox 580 is selected by browsing client device 108a, at next operation 588 network-based social-marketplace platform 102 prepares attributes which are to be used by API 114 of network-based social-media platform 202 for posting the comments. These attributes may include additional information such as social-media user ID 370 or other user profile information that may be used by social-media platform, all of which may be culled from various electronic records of network-based social-marketplace platform 102 to enable social-media platform 202 to recognize the account associated with browsing client device 108a. API 116 of network-based social-marketplace platform 102 transmits the prepared attributes at operation 588, which is received by API 114 of network-based social-media platform 202 at operation 590. Comments are then posted automatically by network-based social-media platform 202 through predefined processes 592 of network-based social-media platform 202 in well known conventional manner. The comments may then be rendered by networked client devices 108c as a mere posting in operation 594. It should be noted that optionally, the comments may be directly posted to social-media platform 202 automatically when the same is posted to social-marketplace platform 102, instead. It should further be noted that if network-based social-marketplace 102 is not associated with network-based social-media platform 202, post comments to social media attribute will not be required and hence, operations (e.g., operations 578, 588, 590, 592, and 594) related to posting comments to social media platform 202 will not be required.

Figures 1, 11C:
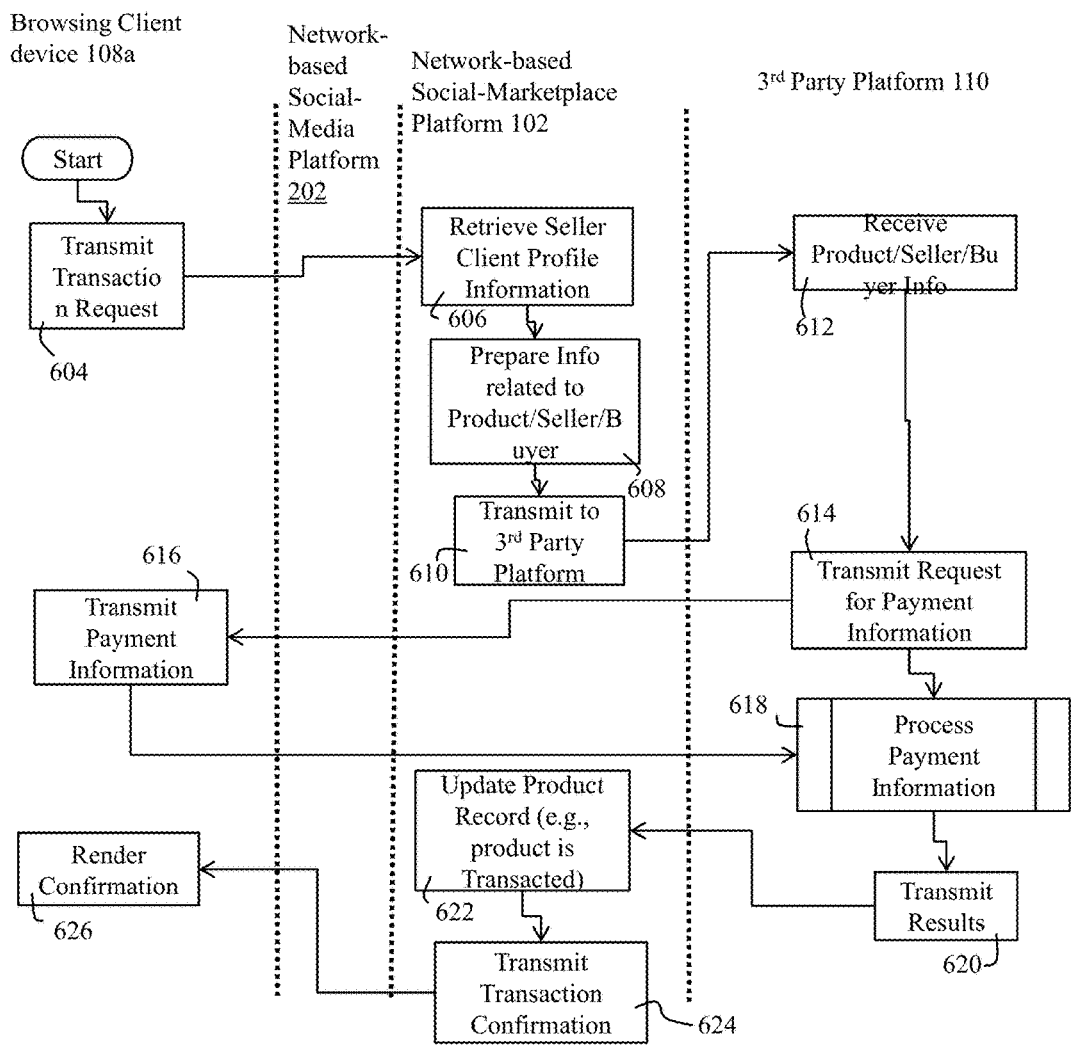
Figures 2, 11C:
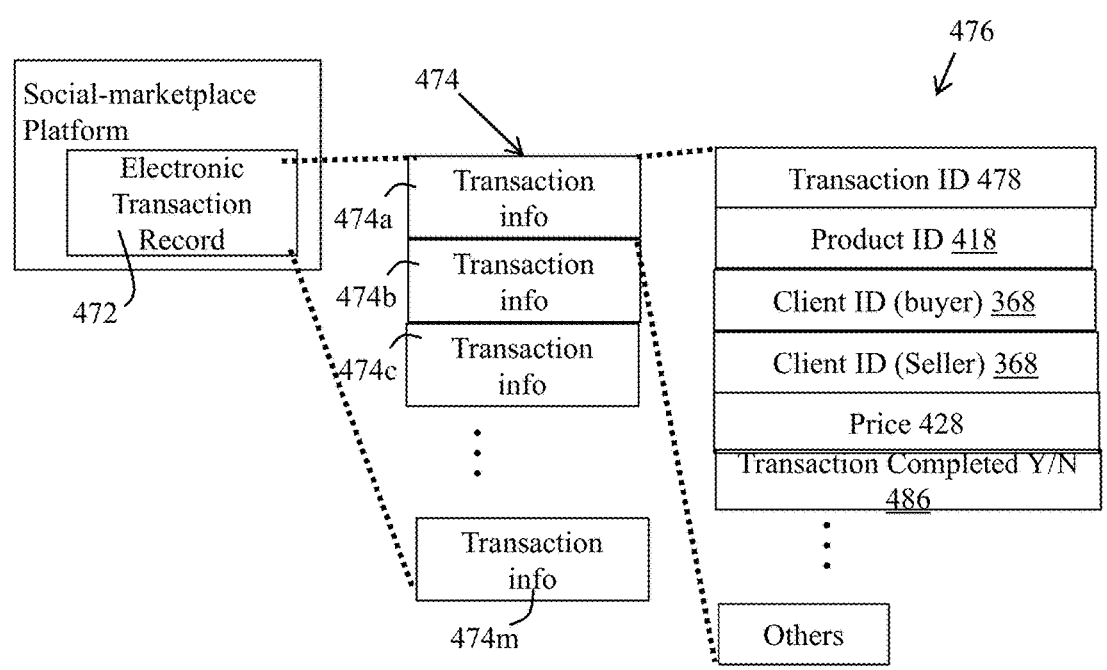

FIG. 11C-1 is a non-limiting, exemplary illustration of a general flow diagram for transacting a product in accordance with an embodiment of the present invention. Referring back to FIGS. 11A-1 and 11A-2, browsing client device 108a may transmit a request to transact product by selection of "Buy Now" GUI icon 602, which is indicated as operation 604 in FIG. 11C-1. Transmit transaction request operation is received by network-based social-marketplace platform 102 at operation 606 where seller client profile information 364 and product information 414 are retrieved. At operation 608, network-based social-marketplace platform 102 prepare data related to product, seller, and buyer culled from various electronic records, and at operation 610 transmits data to a third party platform 110.

The received information at operation 612 is then processed in well known conventional manner, including transmitting payment information to buyer at operation 614, which is rendered by browsing client device 108a at operation 616. Thereafter, Browsing client device 108a transmits required payment information to third party platform 110 for processing at operation 618 where it is processed by third party platform 110 in well known conventional manner, the results of which is transmitted at operation 620 to network-based social-marketplace platform 102. At operation 622, network-based social-marketplace platform 102 updates product electronic record 412 and transmits transaction confirmation to browsing client device 108a at operation 624 where it is rendered by browsing client device 108a at operation 626.

FIG. 11C-2 is a non-limiting, exemplary chart of an electronic transaction record in accordance with the present invention, which is used to track transaction within network-based social-marketplace platform. As illustrated, the transaction record 472 is a record of transactions. Accordingly, electronic transaction record 472 may include one or more transaction information 474 related to transactions made, with each transaction information 474 having attributes 476 the values of which define transaction record 472. Non-limiting, non-exhaustive listing of attributes 476 for a transaction information 474 may include:

Transaction ID 478, a globally unique identifier of particular transaction
Client ID 368 for Buyer
Client ID 368 for seller
Product ID 418
Price 428
Transaction Completed 486

Figure 12A:
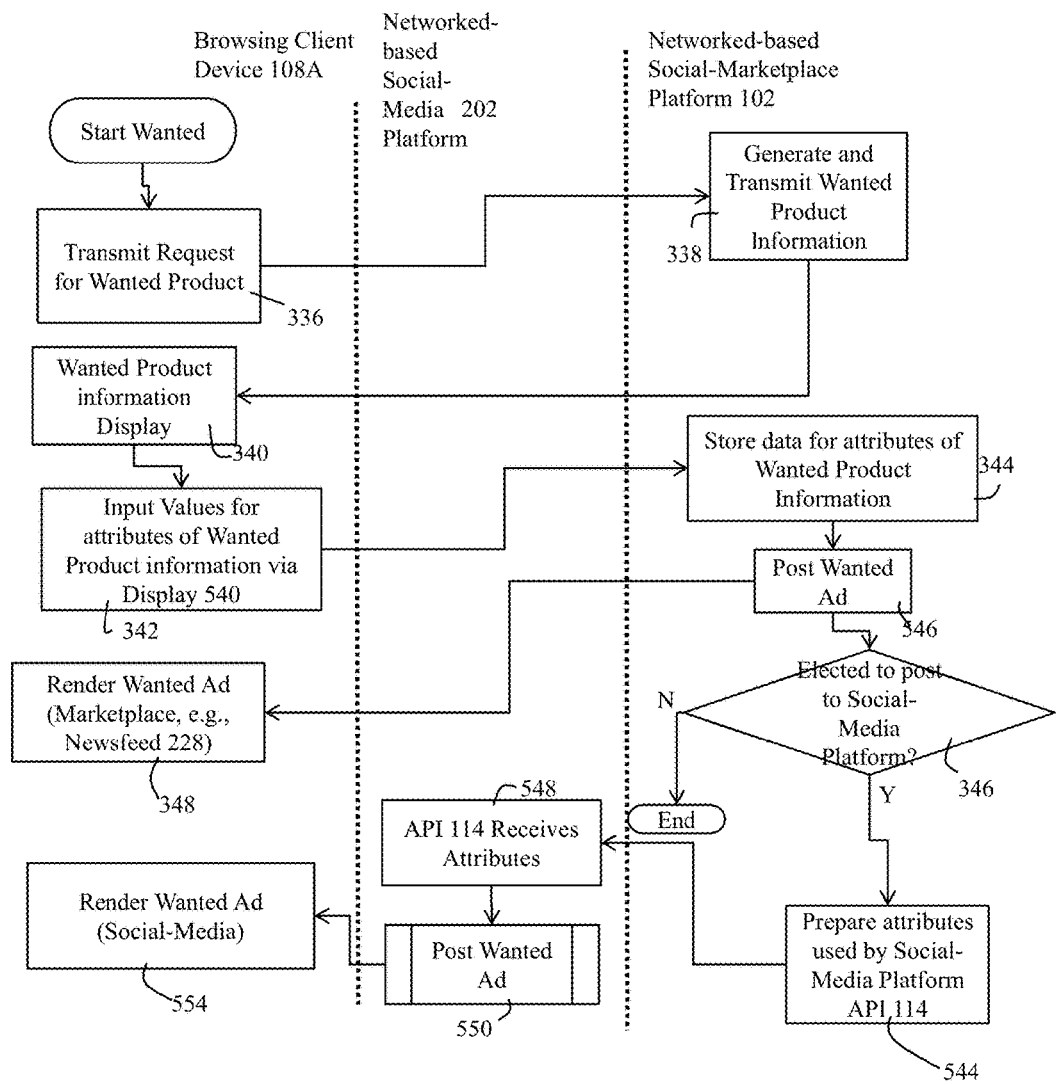
Figures 1, 12B:
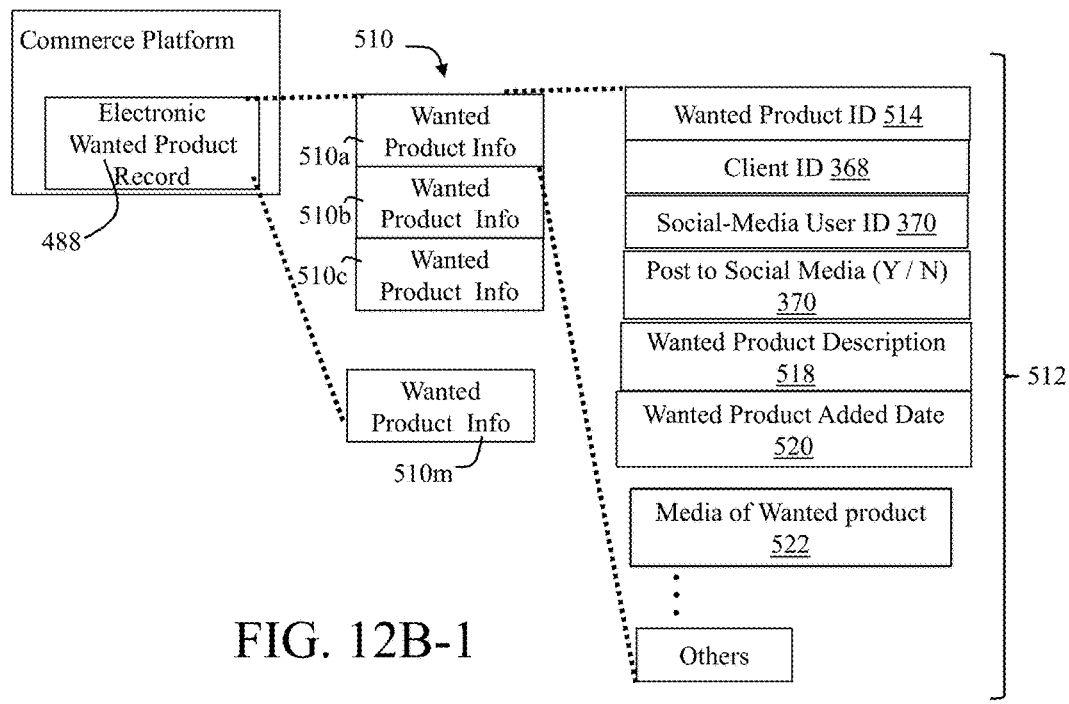
Figures 2, 12B:
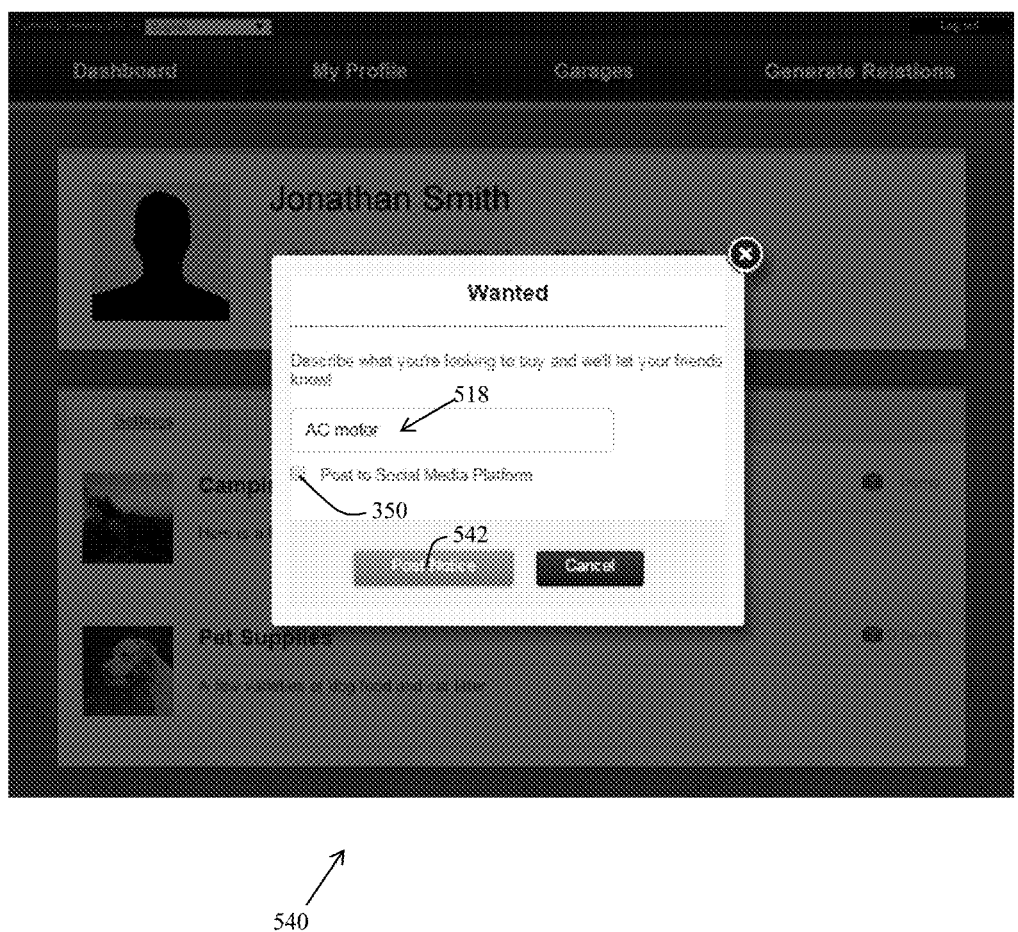
Figures 3, 12B:
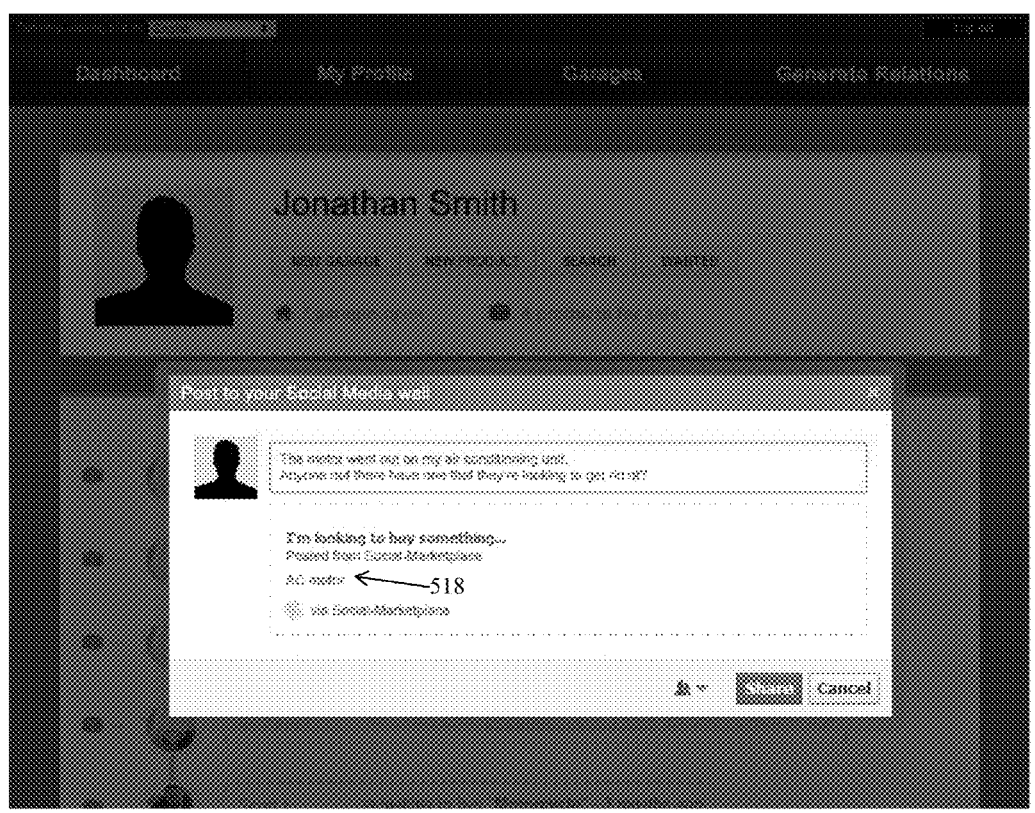

Browsing client device 108a may also alert all the accounts of related client devices 108b regarding a wanted product. FIGS. 12A to 12B-3 are non-limiting, exemplary illustrations of operations for generating wanted ads in accordance with one or more embodiments of the present invention.

As illustrated in FIG. 12A, browsing client device 108a forwards a request (for example, using a "Wanted" GUI icon 236) to the network-based social-marketplace platform 102 to post a wanted ad at operation 336. Network based social-marketplace platform 102 receives the wanted ad request, and at operation 338 returns a wanted product information 510 to browsing client device 108a, which displays a wanted product information GUI dialog box 540 (best shown in FIG. 12B-2) at operation 340.

As best illustrated in FIG. 12B-1, an electronic wanted product record 488 is a record of products wanted, but not found, which enables a browsing client device 108a to generate a wanted ad. Accordingly, electronic wanted product record 488 may include one or more wanted product information 510 related to one or more wanted products, with each wanted product information 510 having attributes 512 the values of which define the wanted product record 488. Non-limiting, non-exhaustive listing of attributes 512 for wanted product information 510 may include:

Wanted Product ID 514, which is a globally unique identifier of particular product wanted
Client ID 368
Social-Media User ID 370 (may be used to post wanted ad on social-media platform 202). If network-based social-marketplace 102 is not associated with network-based social-media platform 202 (as detailed below in relation to FIGS. 13 and 14), social-media user ID 370 will not be required.

Post to Social Media (Y/N) 350—enables the wanted ad to also be posted to external networks such as networked-based social-media platform 202

Wanted Product Description 518

Wanted product added date 520

Media attribute 522 related to wanted product (e.g., images, videos, etc.)

As best illustrated in FIG. 12B-2, non-limiting examples of attributes 512 may be displayed in the wanted ad GUI dialog box 540 of FIG. 12B-2 that may include, for example, brief description attribute 518 of the wanted product, a media (e.g., a picture) attribute 522, Post to Social Media attribute 350, which enables the wanted ad to also be posted on social-media platform (detailed below), and so on. As with other electronic records, memory/storage module 162 of browsing client device 108*a* may be accessed in well-known conventional manner for data to define or set value of an attribute. It should be noted that if network-based social-marketplace 102 is not associated with network-based social-media platform 202, post to social media attribute 350 will not be required.

Referring back to FIG. 12A, browsing client device 108*a* sets the values of the attributes 512 as displayed in wanted ad GUI dialog box 540 at operation 342. Thereafter, browsing client device 108*a* transmits set values for attributes 512 to network-based social-marketplace platform 102 at operation 342 when "post notice" GUI 542 is selected.

Values for set attributes 512 is received and stored by network-based social-marketplace platform 102 at operation 344, and the wanted ad is posted at operation 546 and rendered by client device at operation 348. As part of the processing, network-based social-marketplace platform 102 further determines if instructions are provided to post wanted ad to social-media platform 202 at operation 346. Referring to FIGS. 12B-2 and 12A, if post to social media attribute illustrated as a GUI checkbox 350 in FIG. 12B-2 is selected by browsing client device 108*a*, at next operation 544 network-based social-marketplace platform 102 prepares attributes which are to be used by API 114 of network-based social-media platform 202 for posting the wanted ad (further detailed below). If GUI checkbox 350 is not selected by browsing client device 108*a*, network-based social-marketplace platform 102 posts the wanted ad at operation 546 regardless, which is displayed within newsfeed 228 and rendered by browsing client device 108*a* and related client devices 108*b* at operation 348 (best illustrated in FIG. 6A as wanted ad 262). A user with a desired product (e.g., AC Motor) may then contact the client device 108 that posted the wanted product to commence transaction by selecting a link 552 (FIG. 6A) to the account of the client device 108.

As indicated above, the wanted ad may also be posted on networked-based social media platform 202 if desired to do so in addition to the wanted ad being posted on the activities section (or newsfeed 228) of the dashboard display 224. As indicated above in relation to FIG. 12A, if post to social media attribute illustrated as a GUI checkbox 350 in FIG. 12B-2 is selected by browsing client device 108*a*, at next operation 544 network-based social-marketplace platform 102 prepares attributes which are to be used by API 114 of network-based social-media platform 202 for posting the wanted ad. These attributes may include additional information such as social-media user ID 370 or other user profile information that may be used by social-media platform, all of which may be culled from various electronic records of network-based social-marketplace platform 102 to enable social-media platform 202 to recognize the account associated with browsing client device 108*a*. API 116 of network-based social-marketplace platform 102 transmits the prepared attributes at operation 544, which is received by API 114 of network-based social-media platform 202 at operation 548. The wanted ad is then posted automatically by network-based social-media platform 202 through predefined processes 550 of network-based social-media platform 202 in well known conventional manner, including generating well known conventional dialog box (FIG. 12B-3) to enable browsing client device 108 to "share" the wanted ad with networked client devices 108*c* on network-based social-media platform 202. The wanted ad is finally rendered by networked client devices 108*c* as a mere posting in operation 554. It should be noted that if network-based social-marketplace 102 is not associated with network-based social-media platform 202, post to social media attribute 350 will not be required and hence, operations (e.g., operations 346, 544, 548, 550, and 554) related to posting wanted ad to social media platform will not be required.

FIGS. 13 and 14 are non-limiting, exemplary illustrations of a network-based social-marketplace platform that is not associated with a network-based social-media platform. System 100*b* illustrated in FIGS. 13 and 14 includes similar corresponding or equivalent components, interconnections, functional, operational, and or cooperative relationships as system 100*a* that is shown in FIGS. 1A to 12B-3, and described above. Therefore, for the sake of brevity, clarity, convenience, and to avoid duplication, the general description of FIGS. 13 and 14 will not repeat every corresponding or equivalent component, interconnections, functional, operational, and or cooperative relationships that has already been described above in relation to system 100*a* that is shown in FIGS. 1A to 12B-3.

FIG. 13 illustrates the general overview of system architecture 100*b* suitable for implementing one or more embodiments of the present invention. As shown, the system architecture 100*b* comprises one or more client-devices 108 connected to the network-based social-marketplace platform 102 via Internet/Network 104. Specifically, the client-devices 108 comprise one or more standalone client-devices (e.g., mobile phones) connected to the network-based social-marketplace platform 102 using a conventional network/Internet 104 and conventional communications protocols.

Upon registration and login, client device 108 is generally directed to a home screen 208 (FIG. 3). It should be noted that the methods or processes for download, installation, registration, and login to launch or create a new client account or to launch or login into an existing account via an electronic device (e.g., mobile devices, desktops, laptops, etc.) is done through well-known existing processes. Upon creation or logging into a client account, network-based social-marketplace platform 102 may cull existing client profile information from a variety of electronic records shown in FIG. 1D.

The network-based social-marketplace platform 102 illustrated in FIG. 13 facilitates and promotes commerce amongst client devices 108 with accounts that are related. Creating relationships between accounts of client devices 108 with accounts on network-based social-marketplace platform 102 of system 100*b* may be accomplished in well-known existing processes. Non-limiting example of a known process to establish relationships between accounts may be by use of invitations, which may be implemented in very similar processes to existing hybrid peer-to-peer client/server systems such as SKYPE® where two devices cannot communicate unless their reciprocal contacts are accepted by both devices to establish a relationship between the two devices. In this non-limiting embodiment, a client device 108x may establish a relationship with another client device 108y by activation of generate relations GUI icon 220, which would launch the exemplary invitation GUI shown in FIG. 14, with the remaining functionality of invitation processed in well-known conventional manner, such as transmitting the invitation via email or other well-known mechanism to the other client device. The relationships generated are then stored within databases 118 of network-based social-marketplace platform 102 for use as described above.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, ad spots may be hosted on the network-based social-marketplace platform 102, which would allow other third-party platforms to serve advertisements to be displayed to the client device in well-known manner. The advertisements may or may not be "targeted" ads, which means that they may or may not be generated based on content being viewed by the browsing client device. As another example, network-based social marketplace platform 102 may generate fees based on subscription, listings of products, or brokerage fees from every transaction (similar to existing commerce sites) in a number of well-known manners. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A transaction system, comprising:
a plurality of client computing devices that are networked by one or more server computing machines of a first network and a second network;
the one or more server computing machines of the second network enable establishment of a relationship between two or more accounts of two or more client computing devices of the plurality of client computing devices of the first network based on a predetermined criteria, with the two or more client computing devices with related accounts established by the one or more server computing machines of the second network forming related client computing devices on the second network;
one or more server computing machines of the second network allow transaction between the related client computing devices only, while excluding non-related but networked client computing devices of the first network from transaction within the second network;
wherein: the relationship of related client computing devices is updated by the one or more server computing machines of the second network when a related client computing device of the plurality of client computing devices connects to the second network in accordance with:
the one or more server computing machines of the second network transmitting to the first network a request of accounts of one or more client computing devices that are networked with the related client computing device on the first network;
the one or more server computing machines of the second network receives the networked accounts of one or more client computing devices on first network that are networked with the related client computing device on the first network;
the one or more server computing machines of the second network deletes existing related accounts of client computing devices on the second network that are related to the related client computing device;
the one or more server computing machines of the second network establishes a new set of related client computing devices on the second network for the related client computing device based on the received networked accounts of the related client computing device on the first network in accordance with:
the second network parsing through user accounts of the client computing device from the first network to determine a match with a client identification record on an electronic client record of the second network.

2. A transaction system, comprising:
a plurality of client computing devices that are networked by one or more server computing machines of a first network;
the one or more server computing machines of the first network enable establishment of a relationship between two or more accounts of two or more client computing devices of the plurality of client computing devices based on a first predetermined criteria, with the two or more client computing devices with networked accounts forming networked client computing devices;
two or more of the networked client computing devices are further networked on one or more server computing machines of a second network that is associated with the one or more server computing machines of the first network based on a second predetermined criteria to form related client computing devices;
one or more server computing machines of the second network allow transaction between the related client computing devices only, while excluding non-related client computing devices from transactions on the second network wherein: the association of networked client computing devices to form related client computing devices is updated when a related client computing device connects to the second network in accordance with:

the one or more server computing machines of the second network transmitting to the first network a request of accounts of one or more client computing devices that are networked with the related client computing device on the first network;

the one or more server computing machines of the second network receive the networked accounts of one or more client computing devices on the first network that are networked with the related client computing device on the first network;

the one or more server computing machines of the second network delete existing related accounts of client computing devices on the second network that are related to the related client computing device;

the one or more server computing machines of the second network establish a new set of related client computing devices on the second network for the related client computing device based on the received networked accounts of the related client computing device on the first network in accordance with:

the second network parsing through user account of the client computing device from the first network to determine a match with a client identification record on an electronic client record of the second network.

3. A method for transaction, comprising:

networking client computing devices on a first network;

establishing a relationship between accounts of two or more networked client computing devices on a second network to form related computing devices;

allowing transactions only between two or more networked client computing devices with established relationships on a second network while excluding other networked client computing devices from transaction updating the established relationship between accounts of networked client computing devices on the second network when a networked client computing device of two or more network client computing devices connects to the networked client computing devices of the second network in accordance with:

one or more server computing machines of the second network transmitting to the first network a request of accounts of one or more client computing devices that are networked with a related client computing device on the first network;

the one or more server computing machines of the second network receive the networked accounts of one or more client computing devices on first network that are networked with the related client computing device on the first network;

the one or more server computing machines of the second network delete existing related accounts of client computing devices on the second network that are related to the related client computing device;

the one or more server computing machines of the second network establish a new set of related client computing devices on the second network for the related client computing device based on the received networked accounts of the related client computing device on the first network in accordance with:

the second network parsing through user account of the client computing device from the first network to determine a match with a client identification record on an electronic client record of the second network.

4. A non-transitory computer-readable storage device storing instructions that, when executed by one or more processors, cause the one or more processors to perform operations, comprising:

establishing relationships on a second network between two or more accounts of networked client computing devices on a first network based on a predetermined criteria, resulting in related client devices;

allowing transaction only between the related client computing devices with established relationship between accounts, while excluding networked but non-related client computing devices;

updating the established relationship of related client devices on the second network when a related client device connects to the second network in accordance with:

one or more server computing machines of the second network transmitting to the first network a request of accounts of one or more client computing devices that are networked with the related client computing device on the first network;

the one or more server computing machines of the second network receive the networked accounts of one or more client computing devices on first network that are networked with the related client computing device on the first network;

the one or more server computing machines of the second network delete existing related accounts of client computing devices on the second network that are related to the related client computing device;

the one or more server computing machines of the second network establish a new set of related client computing devices on the second network for the related client computing device based on the received networked accounts of the related client computing device on the first network in accordance with:

the second network parsing through user account of the client computing device from the first network to determine a match with a client identification record on an electronic client record of the second network.

5. A method for transacting, comprising:

receiving, at a network-based social-marketplace platform configured to provide marketplace functions and corresponding to a website, a request for a product from a client computing device for transaction;

forwarding a list of products of only related client computing devices that are related to the client computing device of the network-based social-marketplace platform, while excluding a list of products of non-related client computing devices;

updating the relationship of related client computing devices when a related client computing device connects to the network-based social-marketplace platform in accordance with:

the one or more server computing machines of the network-based social-marketplace platform transmitting to a first network a request of accounts of one or more client computing devices that are networked with the related client computing device on the first network;

the one or more server computing machines of the network-based social-marketplace platform receive the networked accounts of one or more client computing devices on the first network that are networked with the related client computing device on the first network;

the one or more server computing machines of the network-based social-marketplace platform delete existing related accounts of client computing devices on the network-based social-marketplace platform that are related to the related client computing device;

the one or more server computing machines of the network-based social-marketplace platform establish a new set of related client computing devices on the network-based social-marketplace platform for the related client computing device based on the received networked accounts of the related client computing device on the first network;

wherein: the network-based social-marketplace platform parses through user accounts of the client computing device from the first network to determine a match with a client identification on an electronic client record of network-based social-marketplace platform.

6. The method for transacting as set forth in claim 5, wherein:

the client computing devices are determined to be related based on an electronic client relations record that is generated by the network-based social-marketplace platform.

7. The method for transacting as set forth in claim 5, wherein:

the electronic client relations record includes:

client identification information of a client account associated with client computing device; and a related client identification information of related client account associated with a related client computing device.

8. The method for transacting as set forth in claim 7, wherein:

the related client identification information is generated from a user account of the client computing device on network-based social-media platform with which the network-based social-marketplace platform is associated.

9. The method for transacting as set forth in claim 6, wherein:

the related client identification information is obtained by electronic invitation.

10. The method for transacting as set forth in claim 6, wherein:

the electronic invitation is forwarded to other client computing devices from the client computing device.

* * * * *